US012757222B2

(12) United States Patent
Hwang et al.

(10) Patent No.: US 12,757,222 B2
(45) Date of Patent: Oct. 6, 2026

(54) METHOD AND DEVICE FOR SENSING RESOURCE FOR SIDELINK COMMUNICATION IN WIRELESS COMMUNICATION SYSTEM

(71) Applicant: LG ELECTRONICS INC., Seoul (KR)

(72) Inventors: Bong Jun Hwang, Seoul (KR); Taehowan Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 736 days.

(21) Appl. No.: 17/928,598

(22) PCT Filed: May 27, 2021

(86) PCT No.: PCT/KR2021/006617
§ 371 (c)(1),
(2) Date: May 18, 2023

(87) PCT Pub. No.: WO2021/242030
PCT Pub. Date: Dec. 2, 2021

(65) Prior Publication Data

US 2023/0276462 A1 Aug. 31, 2023

(30) Foreign Application Priority Data

May 29, 2020 (KR) ........................ 10-2020-0065290
Jul. 9, 2020 (KR) ........................ 10-2020-0084807
Aug. 21, 2020 (KR) ........................ 10-2020-0105460

(51) Int. Cl.
*H04W 72/25* (2023.01)
*H04L 5/00* (2006.01)
(Continued)

(52) U.S. Cl.
CPC ........... *H04W 72/25* (2023.01); *H04L 5/0055* (2013.01); *H04W 72/1263* (2013.01); *H04L 1/1812* (2013.01)

(58) Field of Classification Search
CPC ............. H04W 72/25; H04W 72/1263; H04W 4/46; H04W 92/18; H04W 4/40; H04W 72/02;
(Continued)

(56) References Cited

U.S. PATENT DOCUMENTS

2020/0099479 A1 3/2020 Park
2020/0107236 A1* 4/2020 Tseng .................. H04W 72/044
(Continued)

FOREIGN PATENT DOCUMENTS

WO 2019/197025 A1 10/2019
WO 2020/068973 A1 4/2020

OTHER PUBLICATIONS

Huawei, HiSilicon, "Support for sidelink unicast, groupcase and broadcast", 3GPP TSG RAN WG1 Meeting #94bis, R1-1810137, Chengdu, China, Oct. 8-12, 2018.
(Continued)

*Primary Examiner* — Obaidul Huq
(74) *Attorney, Agent, or Firm* — BRYAN CAVE LEIGHTON PAISNER LLP

(57) ABSTRACT

The present disclosure is to sense a resource for sidelink communication in a wireless communication system. A method of operating a terminal in a wireless communication system may comprise receiving sidelink data through a physical sidelink shared channel (PSSCH) from another terminal and transmitting a feedback signal for the sidelink data through a physical sidelink feedback channel (PSFCH). The feedback signal may comprise hybrid automatic repeat request (HARQ)-acknowledge (ACK)/negative-ACK (NACK) information corresponding to the sidelink data and
(Continued)

information related to a location of the PSSCH, and the feedback signal may be transmitted using a plurality of beams.

16 Claims, 30 Drawing Sheets

(51) Int. Cl.
*H04W 72/1263* (2023.01)
*H04L 1/1812* (2023.01)

(58) Field of Classification Search
CPC .............. H04W 72/0446; H04W 72/53; H04L 5/0055; H04L 1/1812; H04L 1/1858; H04L 1/1893; H04L 1/1671; H04L 1/1854; H04L 1/1861; H04L 1/1896; H04L 5/0044; H04L 27/2607; H04B 7/0408
USPC .......................................... 370/310, 328, 329
See application file for complete search history.

(56) References Cited

U.S. PATENT DOCUMENTS

2020/0336253 A1* 10/2020 He ........................ H04W 76/11
2021/0014831 A1* 1/2021 Ryu ...................... H04L 5/0092
2021/0099269 A1* 4/2021 Wu ...................... H04L 1/1854
2021/0297199 A1* 9/2021 Miao ..................... H04L 1/1819
2022/0232529 A1* 7/2022 Lin ........................ H04L 1/1861
2022/0232549 A1* 7/2022 Yeo ....................... H04L 1/0027
2023/0037535 A1* 2/2023 Luo ....................... H04L 5/0094
2023/0147173 A1* 5/2023 Matsumura ....... H04W 72/1273
370/329

OTHER PUBLICATIONS

Huawei, HiSilicon, "Design and contents of PSCCH and PSFCH", 3GPP TSG RAN WG1 Meeting #96, R1-1903071, Athens, Greece, Feb. 25-Mar. 1, 2019.
LG Electronics, "Discussion on physical layer procedures for NR sidelink", 3GPP TSG RAN WG1 Meeting #98, R1-1908906, Prague, CZ, Aug. 26-30, 2019.
Huawei, HiSilicon, "Sidelink physical layer structure for NR V2X", 3GPP TSG RAN WG1 Meeting #98bis, R1-1910054, Chongqing, China, Oct. 14-20, 2019.
LG Electronics, "Discussion on resource allocation for Mode 2", 3GPP TSG RAN WG1 Meeting #100bis, R1-2001886, e-Meeting, Apr. 20-30, 2020.
"Discussion on resource allocation for Mode 2", LG Electronics, 3GPP TSG RAN WG1 Meeting #101 e-Meeting, May 25-Jun. 5, 2020, R1-2003563, pp. 1-7.
"FL summary#2 of critical issues for 7.2.4.2.2—V2X Mode 2", Moderator (Intel Corporation), 3GPP TSG RAN WG1 Meeting #101-E e-Meeting, May 25-Jun. 5, 2020, R1-2004715, 40 pages.

* cited by examiner

| t1 \ t2 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | | 32 | 62 | 92 | 122 | 152 | 182 | 212 | 242 | 272 | 302 | 332 | 362 | 392 | 422 | 452 | 482 | 481 | 451 | 421 | 391 | 361 | 331 | 301 | 271 | 241 | 211 | 181 | 151 | 121 | 91 |
| 2 | | | 33 | 63 | 93 | 123 | 153 | 183 | 213 | 243 | 273 | 303 | 333 | 363 | 393 | 423 | 453 | 483 | 480 | 450 | 420 | 390 | 360 | 330 | 300 | 270 | 240 | 210 | 180 | 150 | 120 |
| 3 | | | | 34 | 64 | 94 | 124 | 154 | 184 | 214 | 244 | 274 | 304 | 334 | 364 | 394 | 424 | 454 | 484 | 479 | 449 | 419 | 389 | 359 | 329 | 299 | 269 | 239 | 209 | 179 | 149 |
| 4 | | | | | 35 | 65 | 95 | 125 | 155 | 185 | 215 | 245 | 275 | 305 | 335 | 365 | 395 | 425 | 455 | 485 | 478 | 448 | 418 | 388 | 358 | 328 | 298 | 268 | 238 | 208 | 178 |
| 5 | | | | | | 36 | 66 | 96 | 126 | 156 | 186 | 216 | 246 | 276 | 306 | 336 | 366 | 396 | 426 | 456 | 486 | 477 | 447 | 417 | 387 | 357 | 327 | 297 | 267 | 237 | 207 |
| 6 | | | | | | | 37 | 67 | 97 | 127 | 157 | 187 | 217 | 247 | 277 | 307 | 337 | 367 | 397 | 427 | 457 | 487 | 476 | 446 | 416 | 386 | 356 | 326 | 296 | 266 | 236 |
| 7 | | | | | | | | 38 | 68 | 98 | 128 | 158 | 188 | 218 | 248 | 278 | 308 | 338 | 368 | 398 | 428 | 458 | 488 | 475 | 445 | 415 | 385 | 355 | 325 | 295 | 265 |
| 8 | | | | | | | | | 39 | 69 | 99 | 129 | 159 | 189 | 219 | 249 | 279 | 309 | 339 | 369 | 399 | 429 | 459 | 489 | 474 | 444 | 414 | 384 | 354 | 324 | 294 |
| 9 | | | | | | | | | | 40 | 70 | 100 | 130 | 160 | 190 | 220 | 250 | 280 | 310 | 340 | 370 | 400 | 430 | 460 | 490 | 473 | 443 | 413 | 383 | 353 | 323 |
| 10 | | | | | | | | | | | 41 | 71 | 101 | 131 | 161 | 191 | 221 | 251 | 281 | 311 | 341 | 371 | 401 | 431 | 461 | 491 | 472 | 442 | 412 | 382 | 352 |
| 11 | | | | | | | | | | | | 42 | 72 | 102 | 132 | 162 | 192 | 222 | 252 | 282 | 312 | 342 | 372 | 402 | 432 | 462 | 492 | 471 | 441 | 411 | 381 |
| 12 | | | | | | | | | | | | | 43 | 73 | 103 | 133 | 163 | 193 | 223 | 253 | 283 | 313 | 343 | 373 | 403 | 433 | 463 | 493 | 470 | 440 | 410 |
| 13 | | | | | | | | | | | | | | 44 | 74 | 104 | 134 | 164 | 194 | 224 | 254 | 284 | 314 | 344 | 374 | 404 | 434 | 464 | 494 | 469 | 439 |
| 14 | | | | | | | | | | | | | | | 45 | 75 | 105 | 135 | 165 | 195 | 225 | 255 | 285 | 315 | 345 | 375 | 405 | 435 | 465 | 495 | 468 |
| 15 | | | | | | | | | | | | | | | | 46 | 76 | 106 | 136 | 166 | 196 | 226 | 256 | 286 | 316 | 346 | 376 | 406 | 436 | 466 | 496 |
| 16 | | | | | | | | | | | | | | | | | 47 | 77 | 107 | 137 | 167 | 197 | 227 | 257 | 287 | 317 | 347 | 377 | 407 | 437 | 467 |
| 17 | | | | | | | | | | | | | | | | | | 48 | 78 | 108 | 138 | 168 | 198 | 228 | 258 | 288 | 318 | 348 | 378 | 408 | 438 |
| 18 | | | | | | | | | | | | | | | | | | | 49 | 79 | 109 | 139 | 169 | 199 | 229 | 259 | 289 | 319 | 349 | 379 | 409 |
| 19 | | | | | | | | | | | | | | | | | | | | 50 | 80 | 110 | 140 | 170 | 200 | 230 | 260 | 290 | 320 | 350 | 380 |
| 20 | | | | | | | | | | | | | | | | | | | | | 51 | 81 | 111 | 141 | 171 | 201 | 231 | 261 | 291 | 321 | 351 |
| 21 | | | | | | | | | | | | | | | | | | | | | | 52 | 82 | 112 | 142 | 172 | 202 | 232 | 262 | 292 | 322 |
| 22 | | | | | | | | | | | | | | | | | | | | | | | 53 | 83 | 113 | 143 | 173 | 203 | 233 | 263 | 293 |
| 23 | | | | | | | | | | | | | | | | | | | | | | | | 54 | 84 | 114 | 144 | 174 | 204 | 234 | 264 |
| 24 | | | | | | | | | | | | | | | | | | | | | | | | | 55 | 85 | 115 | 145 | 175 | 205 | 235 |
| 25 | | | | | | | | | | | | | | | | | | | | | | | | | | 56 | 86 | 116 | 146 | 176 | 206 |
| 26 | | | | | | | | | | | | | | | | | | | | | | | | | | | 57 | 87 | 117 | 147 | 177 |
| 27 | | | | | | | | | | | | | | | | | | | | | | | | | | | | 58 | 88 | 118 | 148 |
| 28 | | | | | | | | | | | | | | | | | | | | | | | | | | | | | 59 | 89 | 119 |
| 29 | | | | | | | | | | | | | | | | | | | | | | | | | | | | | | 60 | 90 |
| 30 | | | | | | | | | | | | | | | | | | | | | | | | | | | | | | | 61 |
| 31 | | | | | | | | | | | | | | | | | | | | | | | | | | | | | | | |

FIG. 23

METHOD AND DEVICE FOR SENSING RESOURCE FOR SIDELINK COMMUNICATION IN WIRELESS COMMUNICATION SYSTEM

CROSS-REFERENCE TO RELATED APPLICATIONS

This application is a National Stage Filing Under 35 U.S.C. 371 of International Application No. PCT/KR2021/006617, filed on May 27, 2021, which claims the benefit of earliest filing date and right of priority to a Korean patent application 10-2020-0065290, filed May 29, 2020, a Korean patent application No. 10-2020-0084807, filed Jul. 9, 2020 and a Korean application No. 10-2020-0105460, filed Aug. 21, 2020, the entire contents of which are incorporated herein for all purposes by this reference.

TECHNICAL FIELD

The present disclosure relates to a wireless communication system and, more particularly, to a method and device for sensing a resource for sidelink communication in a wireless communication system.

BACKGROUND

A wireless communication system is a multiple access system that supports communication of multiple users by sharing available system resources (e.g., a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (mMTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a method and device for efficiently sensing a resource for sidelink communication in a wireless communication system.

The present disclosure relates to a method and device for efficiently sensing a resource for sidelink communication using beamforming in a wireless communication system.

The present disclosure relates to a method and device for sensing a resource using a feedback signal for sidelink communication in a wireless communication system.

The present disclosure relates to a method and device for notifying of a location of a data channel using a feedback channel for sidelink communication using beamforming in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method of operating a terminal in a wireless communication system comprises receiving sidelink data through a physical sidelink shared channel (PSSCH) from another terminal, and transmitting a feedback signal for the sidelink data through a physical sidelink feedback channel (PSFCH). The feedback signal may comprise hybrid automatic repeat request (HARQ)-acknowledge (ACK)/negative-ACK (NACK) information corresponding to the sidelink data and information related to a location of the PSSCH, and the feedback signal may be transmitted using a plurality of beams.

As an example of the present disclosure, a method of operating a terminal in a wireless communication system may comprise receiving a feedback signal transmitted through a physical sidelink feedback channel (PSFCH) from one of other terminals performing sidelink communication, identifying information related to a location of a physical sidelink shared channel (PSSCH) corresponding to the PSFCH based on the feedback signal, and transmitting sidelink data using a selected resource based on the information. The feedback signal may comprise hybrid automatic repeat request (HARQ)-acknowledge (ACK)/negative-ACK (NACK) information corresponding to sidelink data transmitted between the other terminals and information related to a location of the PSSCH, and the feedback signal may be transmitted using a plurality of beams.

As an example of the present disclosure, a terminal in a wireless communication system may comprise a transceiver and a processor connected to the transceiver. The processor may perform control to receive sidelink data through a physical sidelink shared channel (PSSCH) from another terminal and to transmit a feedback signal for the sidelink data through a physical sidelink feedback channel (PSFCH). The feedback signal may comprise hybrid automatic repeat request (HARQ)-acknowledge (ACK)/negative-ACK (NACK) information corresponding to the sidelink data and information related to a location of the PSSCH, and the feedback signal may be transmitted using a plurality of beams.

As an example of the present disclosure, a terminal in a wireless communication system may comprise a transceiver and a processor connected to the transceiver. The processor may perform control to receive a feedback signal transmitted through a physical sidelink feedback channel (PSFCH) from one of other terminals performing sidelink communication, to identify information related to a location of a physical sidelink shared channel (PSSCH) corresponding to the PSFCH based on the feedback signal and to transmit sidelink data using a selected resource based on the information. The feedback signal may comprise hybrid automatic repeat request (HARQ)-acknowledge (ACK)/negative-ACK (NACK) information corresponding to sidelink data transmitted between the other terminals and information related to a location of the PSSCH, and the feedback signal is transmitted using a plurality of beams.

As an example of the present disclosure, a device may comprise at least one memory and at least one processor functionally connected to the at least one memory. The at least one processor may control the device to receive sidelink data through a physical sidelink shared channel (PSSCH) from another terminal and to transmit a feedback signal for the sidelink data through a physical sidelink feedback channel (PSFCH). The feedback signal comprises hybrid automatic repeat request (HARQ)-acknowledge (ACK)/negative-ACK (NACK) information corresponding to the sidelink data and information related to a location of the PSSCH, and the feedback signal may be transmitted using a plurality of beams.

As an example of the present disclosure, a non-transitory computer-readable medium storing at least one instruction may comprise the at least one instruction executable by a processor. The at least one instruction may instruct a device to receive sidelink data through a physical sidelink shared channel (PSSCH) from another terminal and to transmit a feedback signal for the sidelink data through a physical sidelink feedback channel (PSFCH). The feedback signal comprises hybrid automatic repeat request (HARQ)-acknowledge (ACK)/negative-ACK (NACK) information corresponding to the sidelink data and information related to a location of the PSSCH, and the feedback signal may be transmitted using a plurality of beams.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

As is apparent from the above description, the embodiments of the present disclosure have the following effects.

According to the present disclosure, it is possible to efficiently sense a resource in a situation where beamforming is applied for sidelink communication.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 23 illustrates an example of TRIVs indicated by a combination of two sequences in a wireless communication system according to an embodiment of the present disclosure.

DETAILED DESCRIPTION

Figure 1:
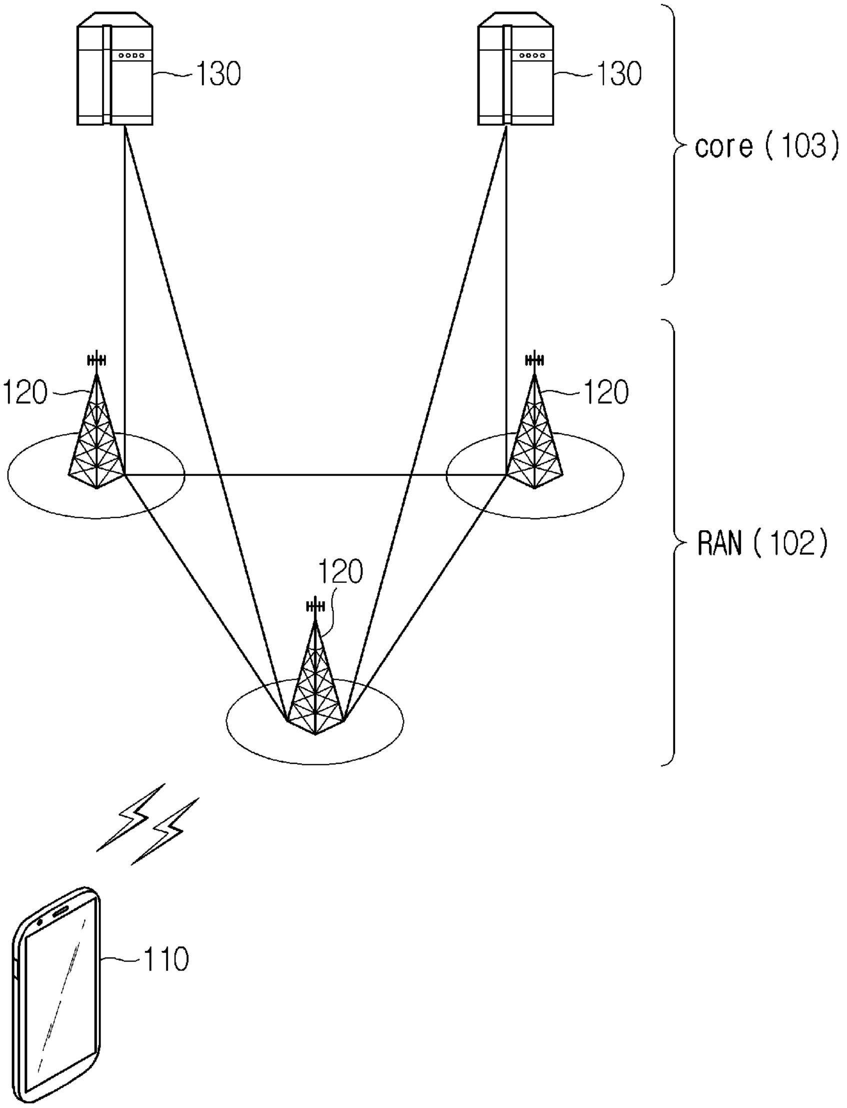
FIG. 1 illustrates a structure of a wireless communication system, in accordance with an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present specification may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

(1) 3GPP LTE
- 3GPP TS 36.211: Physical channels and modulation
- 3GPP TS 36.212: Multiplexing and channel coding
- 3GPP TS 36.213: Physical layer procedures
- 3GPP TS 36.214: Physical layer; Measurements
- 3GPP TS 36.300: Overall description
- 3GPP TS 36.304: User Equipment (UE) procedures in idle mode
- 3GPP TS 36.314: Layer 2—Measurements
- 3GPP TS 36.321: Medium Access Control (MAC) protocol
- 3GPP TS 36.322: Radio Link Control (RLC) protocol
- 3GPP TS 36.323: Packet Data Convergence Protocol (PDCP)
- 3GPP TS 36.331: Radio Resource Control (RRC) protocol (2) 3GPP NR (e.g. 5G)
- 3GPP TS 38.211: Physical channels and modulation
- 3GPP TS 38.212: Multiplexing and channel coding
- 3GPP TS 38.213: Physical layer procedures for control
- 3GPP TS 38.214: Physical layer procedures for data
- 3GPP TS 38.215: Physical layer measurements
- 3GPP TS 38.300: Overall description
- 3GPP TS 38.304: User Equipment (UE) procedures in idle mode and in RRC inactive state
- 3GPP TS 38.321: Medium Access Control (MAC) protocol
- 3GPP TS 38.322: Radio Link Control (RLC) protocol
- 3GPP TS 38.323: Packet Data Convergence Protocol (PDCP)
- 3GPP TS 38.331: Radio Resource Control (RRC) protocol
- 3GPP TS 37.324: Service Data Adaptation Protocol (SDAP)
- 3GPP TS 37.340: Multi-connectivity; Overall description Communication System Applicable to the Present Disclosure FIG. 1 illustrates a structure of a wireless communication system according to an embodiment of the present disclosure. The embodiment of FIG. 1 may be combined with various embodiments of the present disclosure.

Referring to FIG. 1, a wireless communication system includes a radio access network (RAN) 102 and a core network 103. The radio access network 102 includes a base station 120 that provides a control plane and a user plane to a terminal 110. The terminal 110 may be fixed or mobile, and may be called other terms such as a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called other terms such as a fixed station, a Node B, an eNB (eNode B), a gNB (gNode B), an ng-eNB, an advanced base station (ABS), an access point, a base transceiver system (BTS), or an access point (AP). The core network 103 includes a core network entity 130. The core network entity 130 may be defined in various ways according to functions, and may be called other terms such as a core network node, a network node, or a network equipment.

Components of a system may be referred to differently according to an applied system standard. In the case of the LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of the terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of the 5G NR standard, the radio access network 102 may be referred to as an NG-RAN, and the core network 103 may be referred to as a 5GC (5G core). In this case, the core network 103 includes an access and mobility management function (AMF), a user plane function (UPF), and a session management function (SMF). The AMF provides a function for access and mobility management in units of terminals, the UPF performs a function of mutually transmitting data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
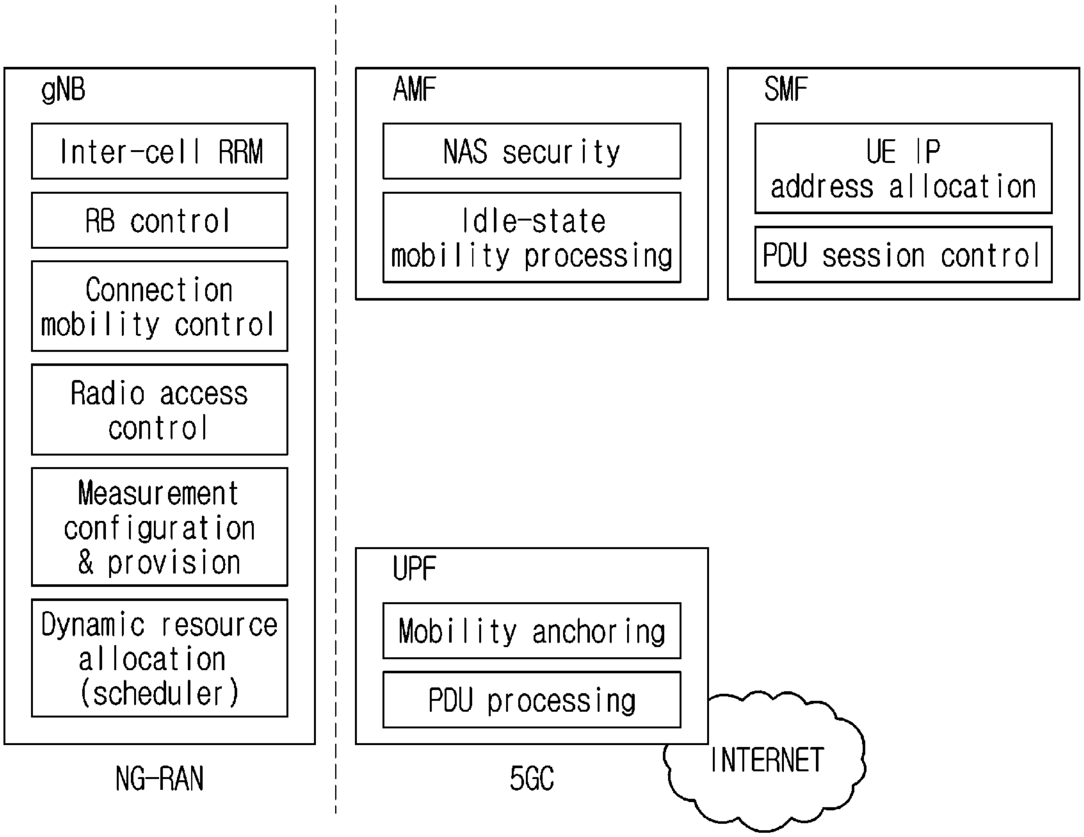
FIG. 2 illustrates a functional division between an NG-RAN and a SGC, in accordance with an embodiment of the present disclosure.

FIG. 2 illustrates a functional division between an NG-RAN and a 5GC, in accordance with an embodiment of the present disclosure. The embodiment of FIG. 2 may be combined with various embodiments of the present disclosure.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer enable to exchange an RRC message between the UE and the BS.

Figure 3A:
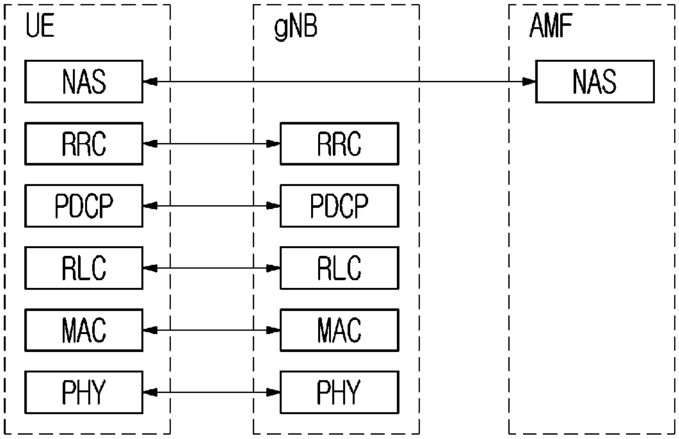
FIG. 3 illustrates a radio protocol architecture, in accordance with an embodiment of the present disclosure.
Figure 3B:
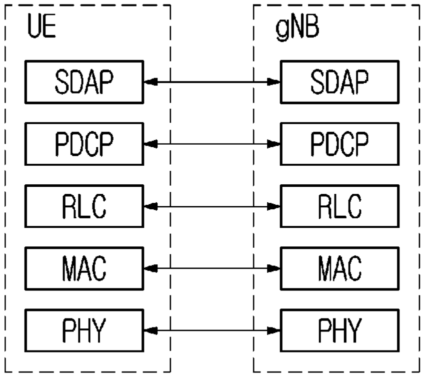

FIGS. 3A and 3B illustrate a radio protocol architecture, in accordance with an embodiment of the present disclosure. The embodiment of FIG. 3 may be combined with various embodiments of the present disclosure. Specifically, FIG. 3A exemplifies a radio protocol architecture for a user plane, and FIG. 3B exemplifies a radio protocol architecture for a control plane. The user plane corresponds to a protocol stack for user data transmission, and the control plane corresponds to a protocol stack for control signal transmission.

Referring to FIGS. 3A and 3B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PI-TY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Radio Resource Structure

Figure 4:
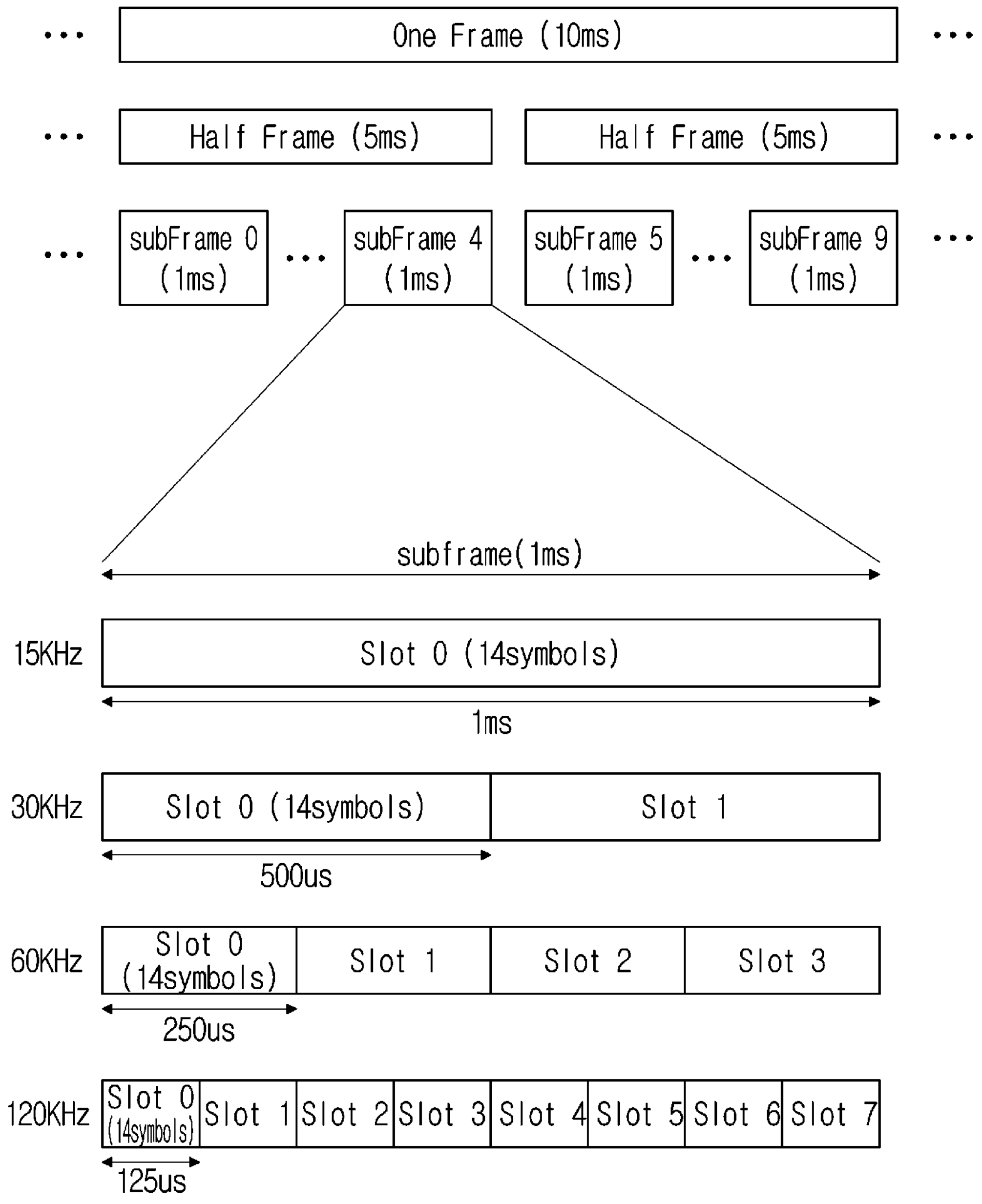
FIG. 4 illustrates a structure of a radio frame in an NR system, in accordance with an embodiment of the present disclosure.

FIG. 4 illustrates a structure of a radio frame in an NR system, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

In a case where a normal CP is used, a number of symbols per slot ($N^{slot}_{symb}$), a number slots per frame ($N^{frame,\mu}_{slot}$), and a number of slots per subframe ($N^{subframe,\mu}_{slot}$) may be varied based on an SCS configuration (μ). For instance, SCS(=15*$2^{\mu}$), $N^{slot}_{symb}$, $N^{frame,\mu}_{slot}$ and $N^{subframe,\mu}_{slot}$ are 15 KHz, 14, 10 and 1, respectively, when μ=0, are 30 KHz, 14, 20 and 2, respectively, when μ=1, are 60 KHz, 14, 40 and 4, respectively, when μ=2, are 120 KHz, 14, 80 and 8, respectively, when μ=3, or are 240 KHz, 14, 160 and 16, respectively, when μ=4. Meanwhile, in a case where an extended CP is used, SCS(=15*$2^{\mu}$), $N^{slot}_{symb}$, $N^{frame,\mu}$ and $N^{subframe,\mu}$ are 60 KHz, 12, 40 and 2, respectively, when μ=2.

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, frequency ranges corresponding to the FR1 and FR2 may be 450 MHz-6000 MHz and 24250 MHz-52600 MHz, respectively. Further, supportable SCSs is 15, 30 and 60 kHz for the FR1 and 60, 120, 240 kHz for the FR2. Among the frequency ranges that are used in an NR system, FR1 may mean a “sub 6 GHz range”, and FR2 may mean an “above 6 GHz range” and may also be referred to as a millimeter wave (mmW).

As described above, the values of the frequency ranges in the NR system may be changed (or varied). For example, comparing to examples for the frequency ranges described above, FR1 may be defined to include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

Figure 5:
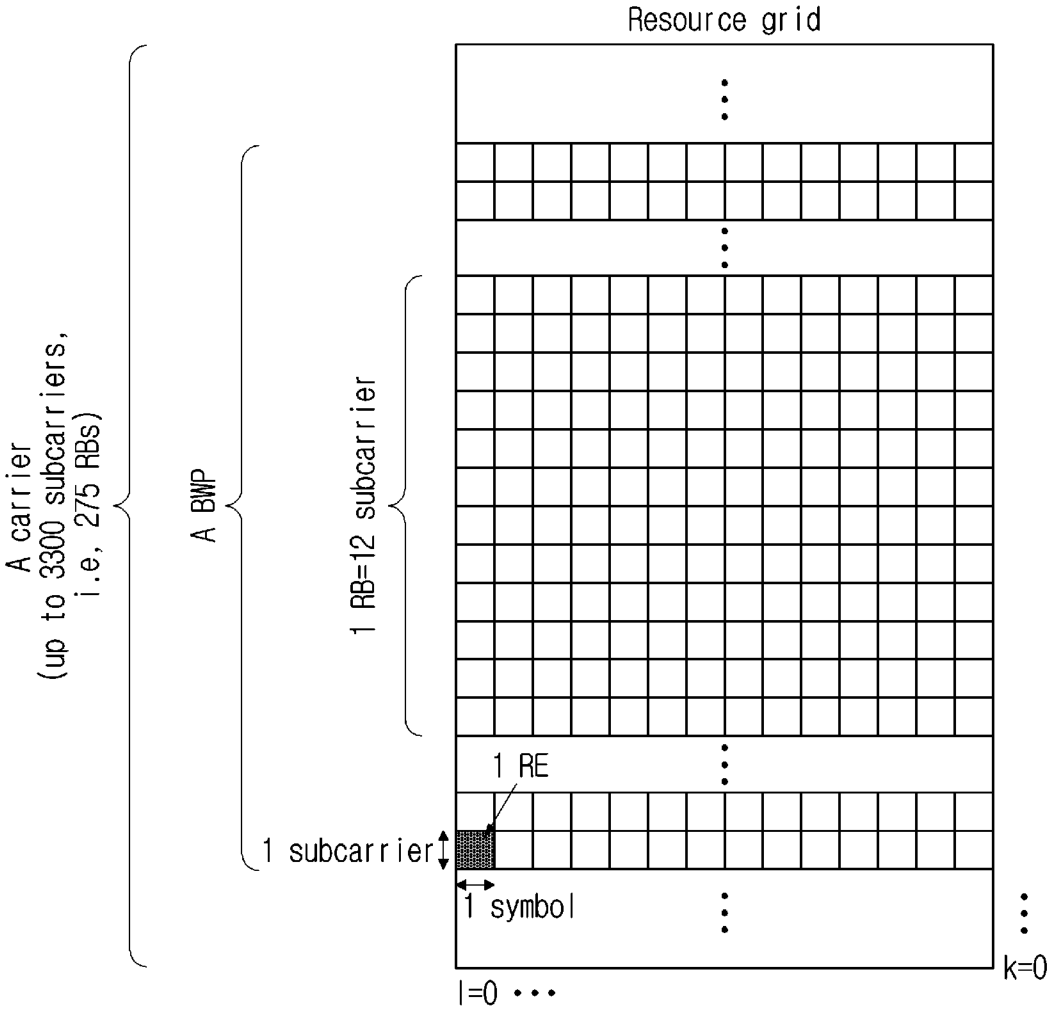
FIG. 5 illustrates a structure of a slot in an NR frame, in accordance with an embodiment of the present disclosure.

FIG. 5 illustrates a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Bandwidth Part (BWP)

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit a Physical Uplink Control Channel (PUCCH) or a Physical Uplink Shared Channel (PUSCH) outside an active UL BWP. For example, in a downlink case, the initial BWP may be given as a consecutive RB set for a remaining minimum system information (RMSI) control resource set (CORESET) (configured by PBCH). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
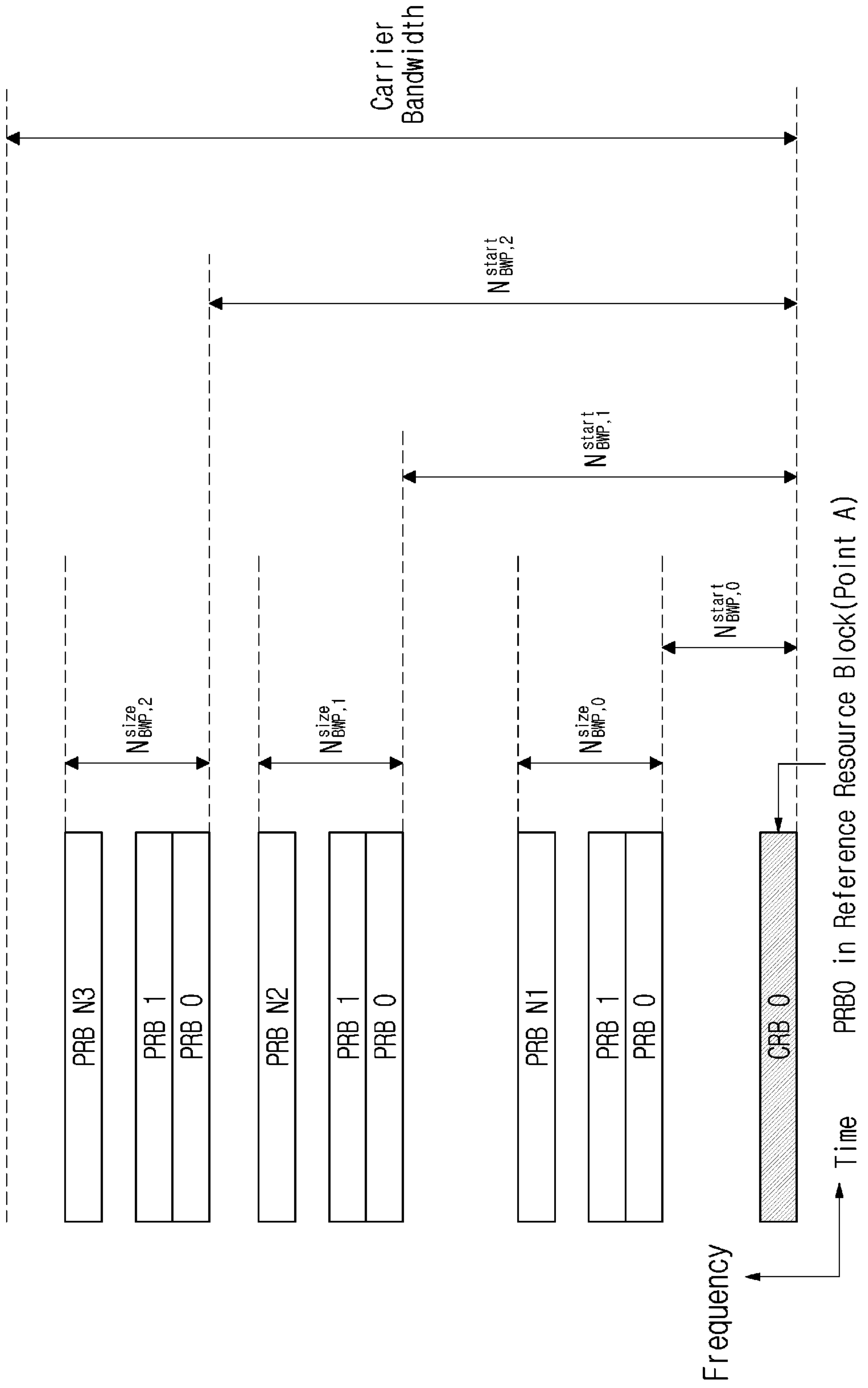
FIG. 6 illustrates an example of a BWP, in accordance with an embodiment of the present disclosure.

FIG. 6 illustrates an example of a BWP, in accordance with an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset ($N^{start}_{BWP}$) from the point A, and a bandwidth ($N^{size}_{BWP}$). For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

V2X or Sidelink Communication

Figure 7A:
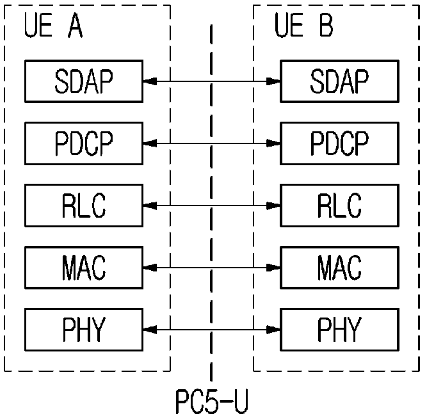
FIGS. 7A and 7B illustrate a radio protocol architecture for a SL communication, in accordance with an embodiment of the present disclosure.
Figure 7B:
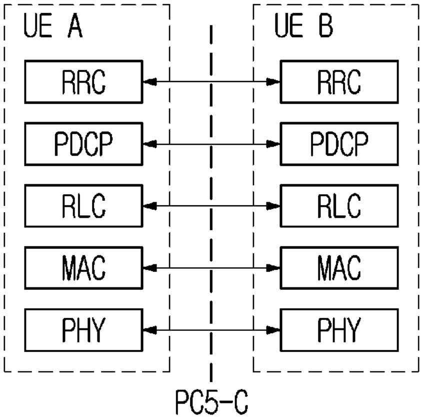

FIGS. 7A and 7B illustrate a radio protocol architecture for a SL communication, in accordance with an embodiment of the present disclosure. The embodiment of FIGS. 7A and 7B may be combined with various embodiments of the present disclosure. More specifically, FIG. 7A exemplifies a user plane protocol stack, and FIG. 7B exemplifies a control plane protocol stack.

Sidelink Synchronization Signal (SLSS) and Synchronization Information

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

For example, based on Table 1, the UE may generate an S-SS/PSBCH block (i.e., S-SSB), and the UE may transmit the S-SS/PSBCH block (i.e., S-SSB) by mapping it on a physical resource.

TABLE 1

| Time-frequency structure of an S-SS/PSBCH block |
| --- |
| In the time domain, an S-SS/PSBCH block consists of $N_{symb}^{S-SBB}$ OFDM symbols, numbered in increasing order from 0 to $N_{symb}^{S-SBB}-1$ within the S-SS/PSBCH block, where S-PSS, S-SSS, and PSBCH with associated DM-RS are mapped to symbols as given by Table 8.4.3.1-1. The number of OFDM symbols in an S-SS/PSBCH block $N_{symb}^{S-SBB}=13$ for normal cyclic prefix and $N_{symb}^{S-SBB}=11$ for extended cyclic prefix. The first OFDM symbol in an S-SS/PSBCH block is the first OFDM symbol in the slot. |
| In the frequency domain, an S-SS/PSBCH block consists of 132 contiguous subcarriers with the subcarriers numbered in increasing order from 0 to 131 within the sidelink S-SS/PSBCH block. The quantities k and l represent the frequency and time indices, respectively, within one sidelink S-SS/PSBCH block. |

TABLE 1-continued

For an S-SS/PSBCH block, the UE shall use
antenna port 4000 for transmission of S-PSS, S-SSS, PSBCH and DM-RS for PSBCH;
the same cyclic prefix length and subcarrier spacing for the S-PSS, S-SSS, PSBCH and DM-RS for PSBCH, Table 8.4.3.1-1: Resources within an S-SS/PSBCH block for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
|---|---|---|
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |
| PSBCH | 0, 5, 6, ..., $N_{symb}^{S-SBB} - 1$ | 0, 1 , . . . , 131 |
| DM-RS for PSBCH | 0, 5, 6, ..., $N_{symb}^{S-SBB} - 1$ | 0, 4, 8, . . . , 128 |

Synchronization Acquisition of SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Synchronization acquisition of an SL UE will be described below.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 8:
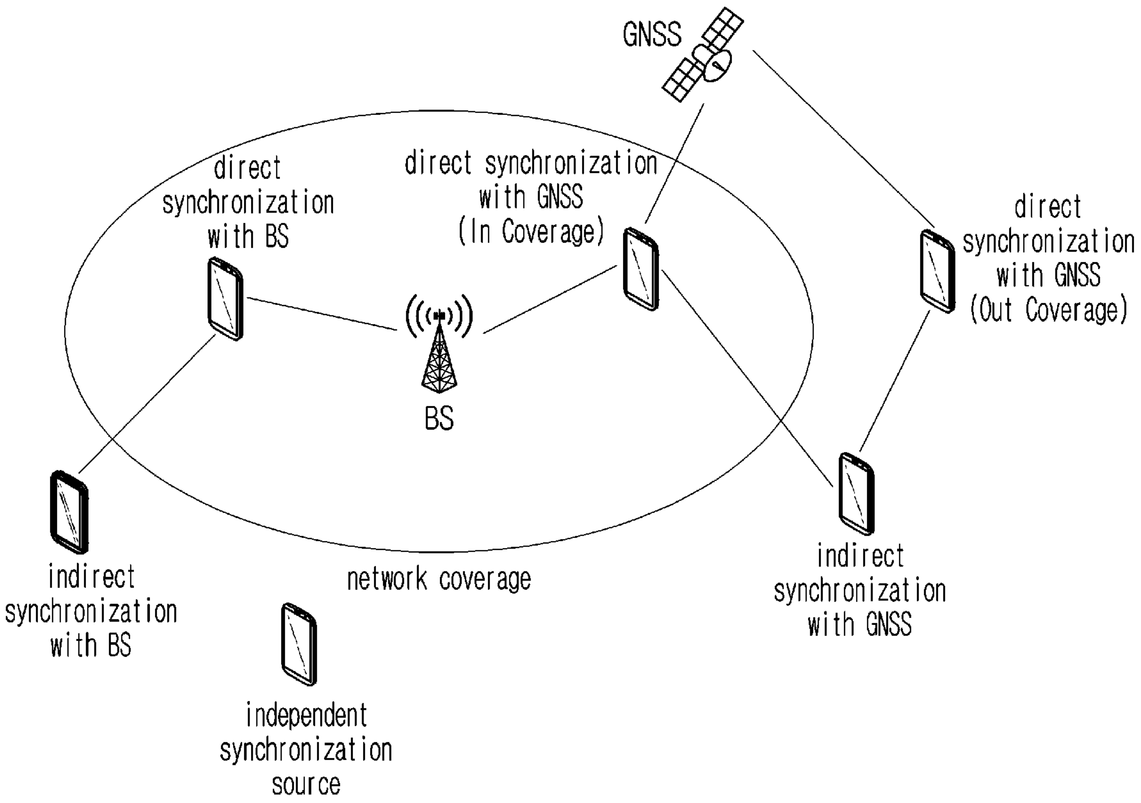
FIG. 8 illustrates a synchronization source or synchronization reference of V2X, in accordance with an embodiment of the present disclosure.

FIG. 8 illustrates a synchronization source or synchronization reference of V2X, in accordance with an embodiment of the present disclosure. The embodiment of FIG. 8 may be combined with various embodiments of the present disclosure.

Referring to FIG. 8, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 3

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 2] or [Table 3], P0 may represent a highest priority, and P6 may represent a lowest priority. In [Table 2] or [Table 3], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the UE may (re)select a synchronization reference, and the UE may obtain synchronization from the synchronization reference. In addition, the UE may perform SL communication (e.g., PSCCH/PSSCH transmission/reception, physical sidelink feedback channel (PSFCH) transmission/reception, S-SSB transmission/reception, reference signal transmission/reception, etc.) based on the obtained synchronization.

Figure 9A:
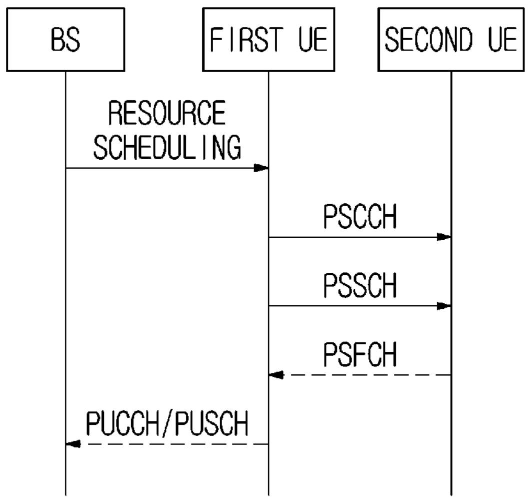
FIGS. 9A and 9B illustrate a procedure of performing V2X or SL communication by a terminal based on a transmission mode, in accordance with an embodiment of the present disclosure.
Figure 9B:
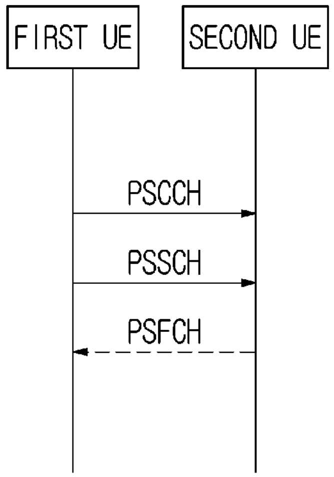

FIGS. 9A and 9B illustrate a procedure of performing V2X or SL communication by a terminal based on a transmission mode, in accordance with an embodiment of the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 9A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 9B exemplifies a UE operation related to an LTE transmission mode 2 or an LTE transmission mode 4. Alternatively, for example, FIG. 9A exemplifies a UE operation related to an NR resource allocation mode 2.

Referring to FIG. 9A, in the LTE transmission mode 1, the LTE transmission mode 3, or the NR resource allocation mode 1, a BS may schedule an SL resource to be used by the UE for SL transmission. For example, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource (s) to the first UE, and the base station may transmit a DCI related to activation or release of the CG resource(s) to the first UE.

Subsequently, the first UE may transmit a PSCCH (e.g., sidelink control information (SCI) or $1^{st}$-stage SCI) to a second UE based on the resource scheduling. After then, the first UE may transmit a PSSCH (e.g., $2^{nd}$-stage SCI, MAC PDU, data, etc.) related to the PSCCH to the second UE. After then, the first UE may receive a PSFCH related to the PSCCH/PSSCH from the second UE. For example, HARQ feedback information (e.g., NACK information or ACK information) may be received from the second UE through the PSFCH. After then, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 4 shows an example of a DCI for SL scheduling.

TABLE 4

| 3GPP TS 38.212 |
|---|
| Format 3_0 |

DCI format 3_0 is used for scheduling of NR PSCCH and NR PSSCH in one cell.

The following information is transmitted by means of the DCI format 3_0 with CRC scrambled by SL-RNTI or SL-CS-RNTI:

- Resource pool index - $\lceil \log_2 I \rceil$ bits, where I is the number of resource pools for transmission configured by the higher layer parameter sl-TxPoolScheduling.
- Time gap - 3 bits determined by higher layer parameter sl-DCI-ToSL-Trans, as defined in clause 8.1.2.1 of [6, TS 38.214]
- HARQ process number - 4 bits as defined in clause 16.4 of [5, TS 38.213]
- New data indicator - 1 bit as defined in clause 16.4 of [5, TS 38.213]
- Lowest index of the subchannel allocation to the initial transmission - $\lceil \log_2(N^{SL}_{subchannel}) \rceil$ bits as defined in clasue 8.1.2.2 of [6, TS 38.214]

SCI format 1-A fields according to clause 8.3.1.1:

- Frequency resource assignment.
- Time resource assignment.

PSFCH-to-HARQ feedback timing indicator - $\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213 ]

PUCCH resource indicator - 3 bits as defined in clause 16.5 of [5, TS 38.213].

Configuration index - 0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC TABLE 4-continued

| 3GPP TS 38.212 |
|---|
| scrambled by SL-RNTI.<br>Counter sidelink assignment index - 2 bits<br>2 bits as defined in clause 16.5.2 of [5, TS 38.213] if the UE is configured with pdsch-HARQ-ACK-Codebook = dynamic<br>2 bits as defined in clause 16.5.1 of [5, TS 38.213] if the UE is configured with pdsch-HARQ-ACK-Codebook = semi-static<br>Padding bits, if required |
| Format 3_1 |
| DCI format 3_1 is used for scheduling of LTE PSCCH and LTE PSSCH in one cell.<br>The following information is transmitted by means of the DCI format 3_1 with CRC scrambled by SL-L-CS-RNTI:<br>Timing offset - 3 bits determined by higher layer parameter sl-TimeOffsetEUTRA, as defined in clause 16.6 of [5, TS 38.213]<br>Carrier indicator - 3 bits as defined in 5.3.3.1.9A of [11, TS 36.212].<br>Lowest index of the subchannel allocation to the initial transmission - $\lceil \log_2(N^{SL}_{subchannel}) \rceil$ bits as defined in clasue 5.3.3.1.9A of [11, TS 36.212].<br>Frequency resource location of initial transmission and retransmission, as defined in 5.3.3.1.9A of [11, TS 36.212]<br>Time gap between initial transmission and retransmission, as defined in 5.3.3.1.9A of [11, TS 36.212]<br>SL index - 2 bits as defined in 5.3.3.1.9A of [11, TS 36.212]<br>SL SPS configuration index - 3 bits as defined in clause 5.3.3.1.9A of [11, TS 36.212].<br>Activation/release indication - 1 bit as defined in clause 5.3.3.1.9A of [11, TS 36.212]. |

Referring to FIG. 9B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannel(s). For example, subsequently, a first UE which has selected resource(s) from a resource pool by itself may transmit a PSCCH (e.g., sidelink control information (SCI) or $1^{st}$-stage SCI) to a second UE by using the resource(s). After then, the first UE may transmit a PSSCH (e.g., $2^{nd}$-stage SCI, MAC PDU, data, etc.) related to the PSCCH to the second UE. In step S8030, the first UE may receive a PSFCH related to the PSCCH/PSSCH from the second UE.

Referring to FIGS. 9A and 9B, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a Pt SCI, a first SCI, a $1^{st}$-stage SCI or a $1^{st}$-stage SCI format, and a SCI transmitted through a PSSCH may be referred to as a 2nd SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B. Table 5 shows an example of a $1^{st}$-stage SCI format.

TABLE 5

| 3GPP TS 38.212 |
|---|
| SCI format 1-A<br>SCI format 1-A is used for the scheduling of PSSCH and $2^{nd}$-stage-SCI on PSSCH<br>The following information is transmitted by means of the SCI format 1-A:<br>Priority - 3 bits as specified in clause 5.4.3.3 of [12, TS 23.287] and clause 5.22.1.3.1 of [8, TS 38.321].<br>Frequency resource assignment - $\lceil \log_2(N^{SL}_{subChannel}(N^{SL}_{subChannel}+1)/2) \rceil$ bits when the value of the higher layer parameter sl-MaxNumPerReserve is configured to 2; otherwise $\lceil \log_2(N^{SL}_{subChannel}(N^{SL}_{subChannel}+1)(2N^{SL}_{subChannel}+1)/6) \rceil$ bits when the value of the higher layer parameter sl-MaxNumPerReserve is configured to 3, as defined in clause 8.1.2.2 of [6, TS 38.214].<br>Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].<br>Resource reservation period - $\lceil \log_2 N_{rsv\_period} \rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.<br>DMRS pattern - $\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.<br>$2^{nd}$-stage SCI format - 2 bits as defined in Table 8.3.1.1-1.<br>Beta_offset indicator - 2 bits as provided by higher layer parameter sl-BetaOffsets2ndSCI and Table 8.3.1.1-2.<br>Number of DMRS port - 1 bit as defined in Table 8.3.1.1-3.<br>Modulation and coding scheme - 5 bits as defined in clause 8.1.3 of [6, TS 38.214].<br>Additional MCS table indicator - as defined in clause 8.1.3.1 of [6, TS 38.214]: 1 bit if one MCS table is configured by higher layer parameter sl-Additional-MCS-Table; 2 bits if two MCS tables are configured by higher layer parameter sl- Additional-MCS-Table; 0 bit otherwise.<br>PSFCH overhead indication - 1 bit as defined clause 8.1.3.2 of [6, TS 38.214] if higher layer parameter sl-PSFCH-Period = 2 or 4; 0 bit otherwise.<br>Reserved - a number of bits as determined by higher layer parameter sl-NumReservedBits, with value set to zero. |

Table 8.3.1.1-1: $2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

Table 8.3.1.1-2: Mapping of Beta_offset indicator values to indexes in Table 9.3-2 of [5, TS 38.213]

| Value of Beta_offset indicator | Beta_offset index in Table 9.3-2 of [5, TS 38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

Table 6 shows an example of a 2° d-stage SCI format.

TABLE 6

| 3GPP TS 38.212 |
|---|
| ■SCI format 2-A<br>SCI format 2-A is used for the decoding of PSSCH, with HARQ operation when HARQ-ACK information includes ACK or NACK, when HARQ-ACK information includes only NACK, or when there is no feedback of HARQ-ACK information.<br>The following information is transmitted by means of the SCI format 2-A:<br>- HARQ process number - 4 bits as defined in clause 16.4 of [5, TS 38.213].<br>- New data indicator - 1 bit as defined in clause 16.4 of [5, TS 38.213].<br>- Redundancy version - 2 bits as defined in clause 16.4 of [6, TS 38.214].<br>- Source ID - 8 bits as defined in clause 8.1 of [6, TS 38.214].<br>- Destination ID - 16 bits as defined in clause 8.1 of [6, TS 38.214].<br>- HARQ feedback enabled/disabled indicator - 1 bit as defined in clause 16.3 of [5, TS 38.213].<br>- Cast type indicator - 2 bits as defined in Table 8.4.1.1-1.<br>- CSI request - 1 bit as defined in clause 8.2.1 of [6, TS 38.214]. |

Table 8.4.1.1-1: Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

■SCI format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Zone ID - 12 bits as defined in clause 5.8.11 of [9, TS 38.331].
- Communication range requirement - 4 bits determined by higher layer parameter sl-ZoneConfigMCR-Index.

Referring to FIGS. 9A and 9B, the first UE may receive the PSFCH based on Table 7. For example, the first UE and the second UE may determine a PSFCH resource based on Table 7, and the second UE may transmit HARQ feedback to the first UE using the PSFCH resource.

TABLE 7

3GPP TS 38.213

■ UE procedure for reporting HARQ-ACK on sidelink

A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled.

A UE expects that a slot $t'^{SL}_k$ $(0 \leq k < T'_{max})$ has a PSFCH transmission occasion resource if k mod $N_{PSSCH}^{PSFCH} = 0$, where $t'^{SL}_k$ is as defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period-r16.

A UE may be indicated by higher layers to not transmit a PSFCH in response to a PSSCH reception [11, TS 38.321].

If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

TABLE 7-continued

| 3GPP TS 38.213 |
|---|

A UE is provided by sl-PSFCH-RB-Set-r16 a set of $M_{PRB,set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch,slot}^{PSFCH}, (i + 1 + j \cdot N_{PSSCH}^{PSFCH}) \cdot M_{subch,slot}^{PSFCH} - 1]$ PRBs from the $M_{PRB,set}^{PSFCH}$ PRBs to slot i among the PSSCH slots associated with the PSFCH slot and sub-channel j, where $M_{subch,slot}^{PSFCH} = M_{PRB,set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB,set}^{PSFCH}$ is a multiple of $N_{subch} \cdot N_{PSSCH}^{PSFCH}$.

A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ where $N_{CS}^{PSFCH}$ is a number of cyclic shift pairs for the resource pool and, based on an indication by higher layers,

- $N_{type}^{PSFCH} = 1$ and the $M_{subch,slot}^{PSFCH}$ PRBs are associated with the starting sub-channel of the corresponding PSSCH
- $N_{type}^{PSFCH} = N_{subch}$ and the $N_{subch} \cdot M_{subch,slot}^{PSFCH}$ PRBs are associated with one or more sub-channels from the $N_{subch}^{PSSCH}$ sub-channels of the corresponding PSSCH The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs.

A UE determines an index of a PSFCH resource for a PSFCH transmission in response to a PSSCH reception as $(P_{ID} + M_{ID}) \bmod R_{PRB,CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift α [4, TS 38.211], from a cyclic shift pair index corresponding to a PSFCH resource index and from $N_{CS}^{PSFCH}$ using Table 16.3-1.

Table 16.3-1: Set of cyclic shift pairs

| | $m_0$ | | | | | |
|---|---|---|---|---|---|---|
| $N^{PSFCH}_{CS}$ | $m_0$ Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α [4, TS 38.211], as in Table 16.3-2 if the UE detects a SCI format 2-A with Cast type indicator field value of "01" or "10", or as in Table 16.3-3 if the UE detects a SCI format 2-B or a SCI format 2-A with Cast type indicator field value of "11". The UE applies one cyclic shift from a cyclic shift pair to a sequence used for the PSFCH transmission [4, TS 38.211].

Table 16.3-2: Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to FIG. 9A, the first UE may transmit SL HARQ feedback to the base station through the PUCCH and/or the PUSCH based on Table 8.

TABLE 8

| 3GPP TS 38.213 |
|---|

16.5 UE procedure for reporting HARQ-ACK on uplink

A UE can be provided PUCCH resources or PUSCH resources [12, TS 38.331] to report HARQ-ACK information that the UE generates based on HARQ-ACK information that the UE TABLE 8-continued

| 3GPP TS 38.213 |
|---|

obtains from PSFCH receptions, or from absence of PSFCH receptions. The UE reports HARQ-ACK information on the primary cell of the PUCCH group, as described in Clause 9, of the cell where the UE monitors PDCCH for detection of DCI format 3_0.

For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.

For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.

For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable

- if the UE receives a PSFCH associated with a SCI format 2-A with Cast type indicator field value of “10”
  - generate HARQ-ACK information with same value as a value of HARQ-ACK information the UE determines from a PSFCH reception in the PSFCH reception occasion and, if the UE determines that a PSFCH is not received at the PSFCH reception occasion, generate NACK
- if the UE receives a PSFCH associated with a SCI format 2-A with Cast type indicator field value of “01”
  - generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in Clause 16.3; otherwise, generate NACK
- if the UE receives a PSFCH associated with a SCI format 2-B or a SCI format 2-A with Cast type indicator field value of “11”
  - generate ACK when the UE determines absence of PSFCH reception for each PSFCH reception occasion from the number of PSFCH reception occasions: otherwise, generate NACK After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.

The UE generates a NACK when, due to prioritization, as described in Clause 16.2.4, the UE does not receive PSFCH in any PSFCH reception occasion associated with a PSSCH transmission in a resource provided by a DCI format 3_0 with CRC scrambled by a SL-RNTI or, for a configured grant, in a resource provided in a single period and for which the UE is provided a PUCCH resource to report HARQ-ACK information. The priority value of the NACK is same as the priority value of the PSSCH transmission.

The UE generates a NACK when, due to prioritization as described in Clause 16.2.4, the UE does not transmit a PSSCH in any of the resources provided by a DCI format 3_0 with CRC scrambled by SL-RNTI or, for a configured grant, in any of the resources provided in a single period and for which the UE is provided a PUCCH resource to report HARQ-ACK information. The priority value of the NACK is same as the priority value of the PSSCH that was not transmitted due to prioritization.

The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant.

A UE does not expect to be provided PUCCH resources or PUSCH resources to report HARQ-ACK information that start earlier than $(N + 1) \cdot (2048 + 144) \cdot \kappa \cdot 2^{\mu} \cdot T_c$ after the end of a last symbol of a last PSFCH reception occasion, from a number of PSFCH reception occasions that the UE generates HARQ-ACK information to report in a PUCCH or PUSCH transmission, where

- $\kappa$ and $T_c$ are defined in [4, TS 38.211]
- $\mu = \min(\mu_{SL}, \mu_{UL})$, where $\mu_{SL}$ is the SCS configuration of the SL BWP and $\mu_{UL}$ is the SCS configuration of the active UL BWP on the primary cell
- N is determined from $\mu$ according to Table 16.5-1

Table 16.5-1: Values of N

| μ | N |
|---|---|
| 0 | 14 |
| 1 | 18 |
| 2 | 28 |
| 3 | 32 |

With reference to slots for PUCCH transmissions and for a number of PSFCH reception occasions ending in slot n, the UE provides the generated HARQ-ACK information in a PUCCH transmission within slot n + k, subject to the overlapping conditions in Clause 9.2.5, where k is a number of slots indicated by a PSFCH-to-HARQ_feedback timing indicator field, if present, in a DCI format indicating a slot for PUCCH transmission to report the HARQ-ACK information, or k is provided by sl-PSFCH-ToPUCCH-CG-Type1-r16. k = 0 corresponds to a last slot for a PUCCH transmission that would overlap with the last PSFCH TABLE 8-continued

| 3GPP TS 38.213 |
|---|
| reception occasion assuming that the start of the sidelink frame is same as the start of the downlink frame [4, TS 38.211]. |
| For a PSSCH transmission by a UE that is scheduled by a DCI format, or for a SL configured grant Type 2 PSSCH transmission activated by a DCI format, the DCI format indicates to the UE that a PUCCH resource is not provided when a value of the PUCCH resource indicator field is zero and a value of PSFCH-to-HARQ feedback timing indicator field, if present, is zero. For a SL configured grant Type 1 PSSCH transmission, a PUCCH resource can be provided by sl-N1PUCCH-AN-r16 and sl-PSFCH-ToPUCCH-CG-Type1-r16. If a PUCCH resource is not provided, the UE does not transmit a PUCCH with generated HARQ-ACK information from PSFCH reception occasions. |
| For a PUCCH transmission with HARQ-ACK information, a UE determines a PUCCH resource after determining a set of PUCCH resources for $O_{UCI}$ HARQ-ACK information bits, as described in Clause 9.2.1. The PUCCH resource determination is based on a PUCCH resource indicator field [5, TS 38.212] in a last DCI format 3_0, among the DCI formats 3_0 that have a value of a PSFCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are indexed in an ascending order across PDCCH monitoring occasion indexes. |
| A UE does not expect to multiplex HARQ-ACK information for more than one SL configured grants in a same PUCCH. |
| A priority value of a PUCCH transmission with one or more sidelink HARQ-ACK information bits is the smallest priority value for the one or more HARQ-ACK information bits. |
| In the following, the CRC for DCI format 3_0 is scrambled with a SL-RNTI or a SL-CS-RNTI. |

Figure 10A:
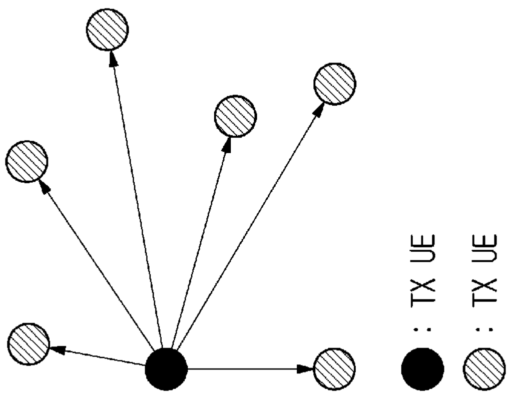
FIGS. 10A to 10C illustrate three cast types, in accordance with an embodiment of the present disclosure.
Figure 10B:
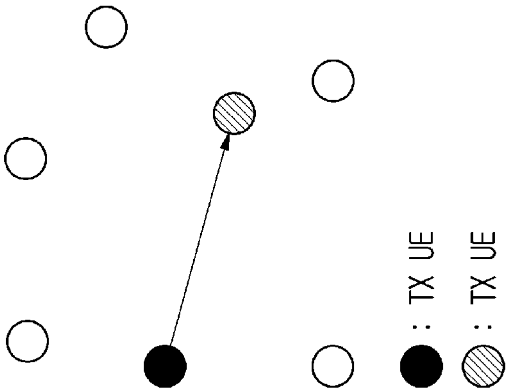
Figure 10C:
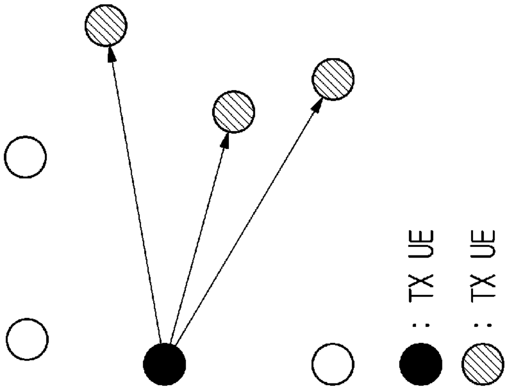

FIGS. 10A to 10C illustrate three cast types applicable to the present disclosure. The embodiment of FIGS. 10A to 10C may be combined with various embodiments of the present disclosure.

Specifically, FIG. 10A exemplifies broadcast-type SL communication, FIG. 10B exemplifies unicast type-SL communication, and FIG. 10C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (Harq) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In the present disclosure, HARQ-ACK may be referred to as ACK, ACK information, or positive-ACK information, and HARQ-NACK may be referred to as NACK, NACK information, or negative-ACK information.

Specific Embodiment of the Present Disclosure

Hereinafter, the present disclosure relates to resource sensing for sidelink communication in a wireless communication system, and more particularly, to a technology for sensing a resource used by terminals performing sidelink communication using a directional beam.

In order to perform millimeter wave (mmWave) communication, the use of a directional beam is considered to offset attenuation caused by path loss. However, 3GPP Release-16 does not consider directional beam characteristics in a sidelink procedure for V2X communication. Accordingly, there may be difficulties in resource sensing of a terminal that desires to use a V2X service using sidelink technology.

After initial beam alignment for bidirectional transmit beamforming of all terminals participating in the service for the V2X service, in particular, the V2V service is completed, data communication of a third-party terminal may be performed while data communication is in progress. In this case, for the communication of the third-party terminal, acquisition of channel information used for data communication between two terminals is a very important procedure. As such a procedure, the 3GPP standard defines a sensing and selection procedure. According to the sensing and selection procedure, the third-party terminal may acquire information on a channel used by other terminals by receiving a PSCCH transmitted between other terminals. In this case, when signals of other terminals are beamformed, the third-party terminal may be in a situation as shown in FIG. 11 below.

Figure 11:
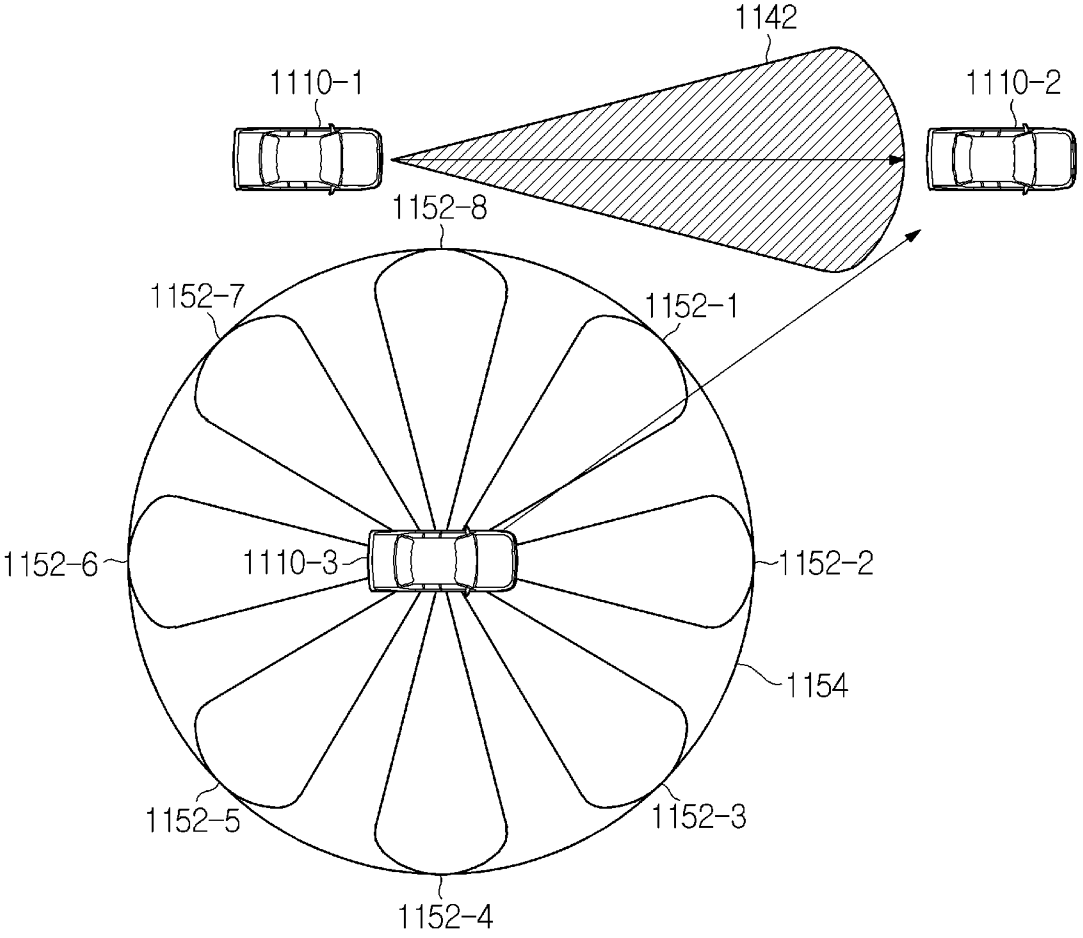
FIG. 11 illustrates an example of a case where a directional beam is used for sidelink communication in a wireless communication system.

FIG. 11 illustrates an example of a case where a directional beam is used for sidelink communication in a wireless communication system. Referring to FIG. 11, terminal A 1110-1 and terminal B 1110-2 perform sidelink communication. At this time, terminal C 1110-3 desires to receive control information transmitted through a PSCCH between terminal A 1110-1 and terminal B 1110-2. However, when terminal A 1110-1 and terminal B 1110-2 use a directional beam 1142, PSCCH reception in terminal C 1110-3 is impossible. That is, depending on the direction of the directional beam 1142 between terminal A 1110-1 and terminal B 1110-2 and a distance from terminal A 1110-1, PSCCH reception is not possible. PSCCH reception is impossible even if terminal C 1110-3 uses an omni-directional beam 1154 or directional beams 1152-1 to 1152-8. Accordingly, the present disclosure proposes a technology necessary to overcome the aforementioned physical limitations.

3GPP NR Release 16 standard defines channels such as PSCCH, PSSCH, PSFCH for sidelink operation. The PSCCH is a control channel for sidelink resource assignment and is used to transmit $1^{st}$-stage SCI, the PSSCH is a data transmission channel and is used to transmit $2^{nd}$-stage SCI, the PSFCH is a feedback information transmission channel and is used to transmit feedback information, that is, HARQ-ACK information, in a unicast mode and a groupcast mode. In addition, the 3GPP 38.213 standard document defines a procedure for sidelink HARQ-ACK transmission in clause 16.3. According to this, in order to transmit HARQ feedback on the PSSCH data packet received from multiple users during a period including up to 4 slots, a base station may transmit a plurality of multiplexed HARQ-ACKs using a PSFCH valid resource through the PSFCH. Using the above description, the terminal, which has received data through the PSSCH, may provide information for sensing to adjacent terminals according to the method shown in FIG. 12 below.

Figure 12:
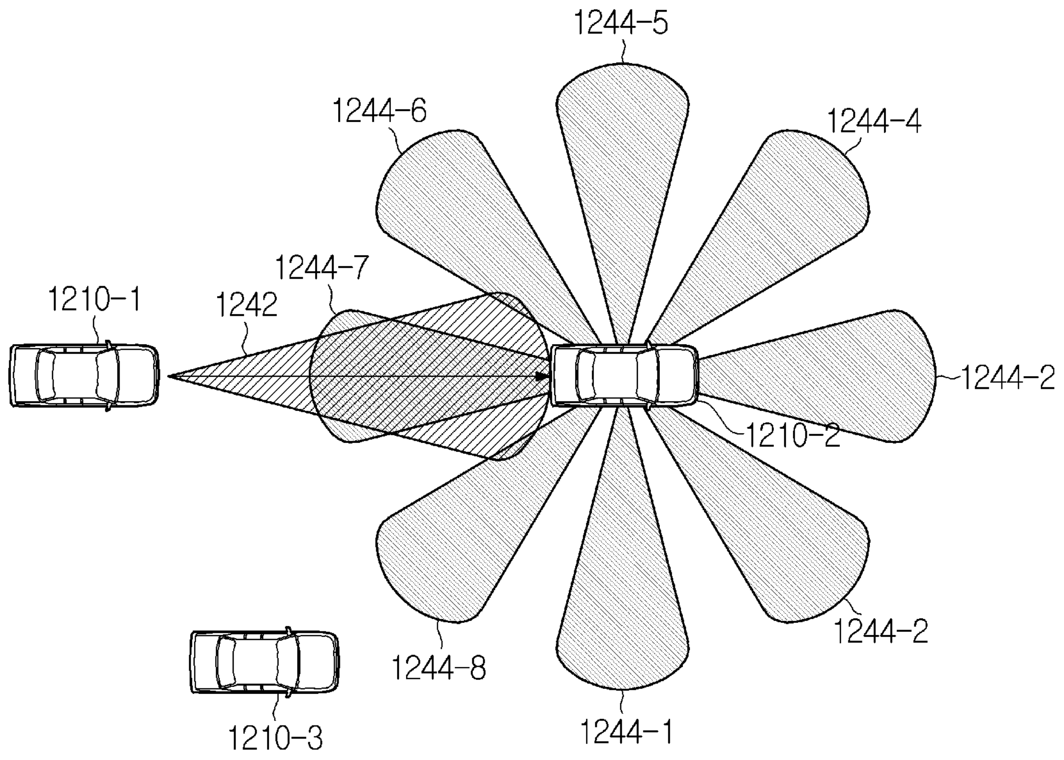
FIG. 12 illustrates the concept of resource sensing using a feedback signal in a wireless communication system according to an embodiment of the present disclosure.

FIG. 12 illustrates the concept of resource sensing using a feedback signal in a wireless communication system according to an embodiment of the present disclosure. Referring to FIG. 12, terminal A 1210-1 and terminal B 1210-2 perform sidelink communication. At this time, terminal C 1210-3 desires to perform sensing. The terminal A 1210-1 transmits data to the terminal B 1210-2 using a transmit beam 1242 through a PSCCH and a PSSCH. Accordingly, the terminal B 1210-2 transmits a feedback signal including HARQ-ACK/NACK in response to the data. In this case, according to various embodiments, the terminal B 1210-2 may repeatedly transmit feedback signals in a plurality of directions using a plurality of transmit beams 1244-1 to 1244-8. In this case, if the terminal C 1210-3 is positioned in a direction of at least one (e.g., beam #8 1244-8) of the transmit beams 1244-1 to 1244-8, terminal C 1210-3 may receive the feedback signal transmitted from the terminal B 1210-2. Therefore, if information for sensing is carried in the feedback signal, the terminal C 1210-3 may sense a resource used by the terminal A 1210-1 and the terminal B 1210-2 based on the feedback signal.

According to various embodiments, the information for resource sensing included in the feedback signal may include information related to the resource used by the terminal A 1210-1 and the terminal B 1210-2, for example, information related to the PSSCH used to transmit sidelink data. Specifically, the information related to the PSSCH is information related to the location of the PSSCH, and may include information for estimating or predicting the location of the PSSCH or information indicating the PSSCH. The information related to the PSSCH may be expressed explicitly or implicitly. The terminal, which has received the feedback signal, may extract a signal including the information related to the PSSCH from the feedback signal, and estimate and identify the location of the PSSCH based on a value of the extracted signal or a combination of elements different from the extracted signal (e.g., the location where the signal is extracted within the feedback signal, another signal included in the feedback signal, etc.).

Figure 13:
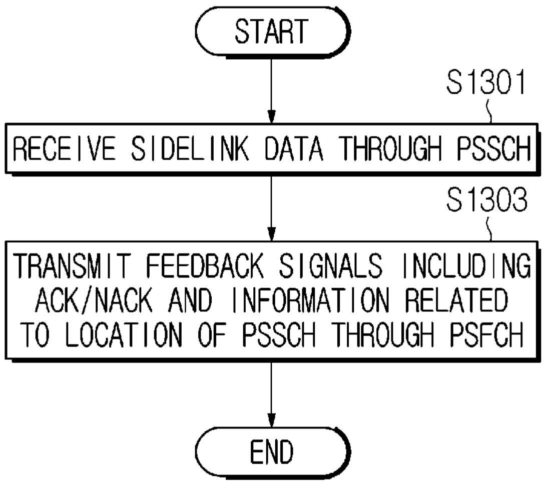
FIG. 13 illustrates an example of a procedure for transmitting a feedback signal including information for resource sensing in a wireless communication system according to an embodiment of the present disclosure.

FIG. 13 illustrates an example of a procedure for transmitting a feedback signal including information for resource sensing in a wireless communication system according to an embodiment of the present disclosure. FIG. 13 illustrates a method of operating a terminal (e.g., the terminal B 1210-2) performing sidelink communication with another terminal (e.g., the terminal A 1210-1).

Referring to FIG. 13, in step S1301, a terminal receives sidelink data through a PSSCH. The terminal may receive SCI through a PSCCH from another terminal after performing synchronization and link setup with another terminal, and receive a data signal transmitted through a PDSCH based on the SCI. The terminal demodulates and decodes the data signal and generates ACK/NACK information indicating whether decoding is successful.

In step S1303, the terminal transmits feedback signals including ACK/NACK and information related to the location of the PSSCH through a PSFCH. That is, the terminal feeds whether decoding is successful back to another terminal and, at the same time, transmits information on sensing of a adjacent terminal. In this case, according to various embodiments, the terminal transmits feedback signals using a plurality of transmit beams having different directions. In this case, the terminal may repeatedly transmit the feedback signal during a plurality of transmission instances (e.g., slots).

Figure 14:
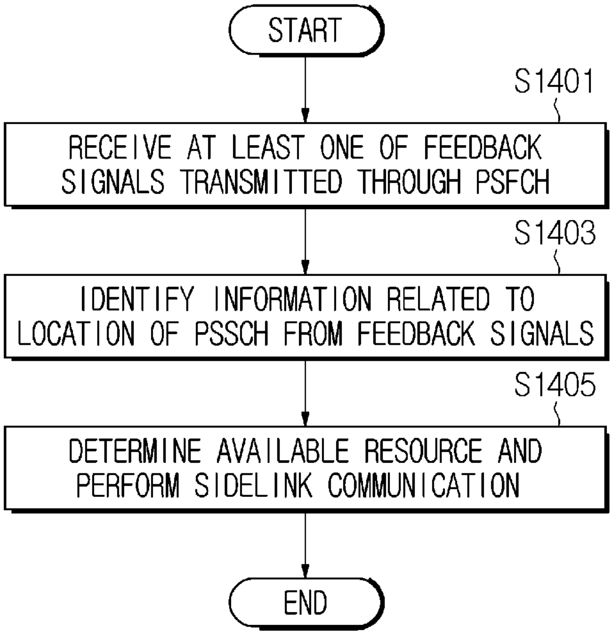
FIG. 14 illustrates an example of a procedure for receiving a feedback signal including information for resource sensing in a wireless communication system according to an embodiment of the present disclosure.

FIG. 14 illustrates an example of a procedure for receiving a feedback signal including information for resource sensing in a wireless communication system according to an embodiment of the present disclosure. FIG. 14 illustrates a method of operating a terminal (e.g., the terminal C 1210-3) which desires to sense a resource used by other terminals (e.g., the terminal A 1210-1 and the terminal B 1210-2) performing sidelink communication.

Referring to FIG. 14, in step S1401, the terminal receives at least one of the feedback signals transmitted through the PSFCH. In other words, the terminal receives at least one of the feedback signals transmitted during sidelink communication between other terminals. Since the feedback signals are transmitted using different transmit beams, the terminal may receive the feedback signal transmitted using a transmit beam directed thereto.

In step S1403, the terminal identifies information related to the location of the PSSCH from the feedback signals. The terminal may identify information related to the location of the PSSCH in a manner corresponding to the structure of the information related to the location of the PSCCH. For example, the terminal may identify the information related to the location of the PSSCH based on at least one of a value and location of a signal including information related to the location of the PSCCH or a structure of the PSFCH.

In step S1405, the terminal determines a usable resource and performs sidelink communication. The terminal may estimate or identify the location of the PSSCH used for sidelink communication of other terminals based on the identified information, identify the other available resources and then perform sidelink using at least some of the identified resources. That is, the terminal may determine resources to be used by the other terminals based on the identified used resource and periodicity of sidelink communication and perform sidelink communication using at least some of the remaining resources except for the determined resources in a resource pool.

According to the embodiments described with reference to FIGS. 13 and 14, resource sensing may be performed using the feedback signal. In this case, the PSFCH for transmitting the feedback signal has a relation with the corresponding PSSCH and the relation is shown in FIG. 15 below.

Figure 15:
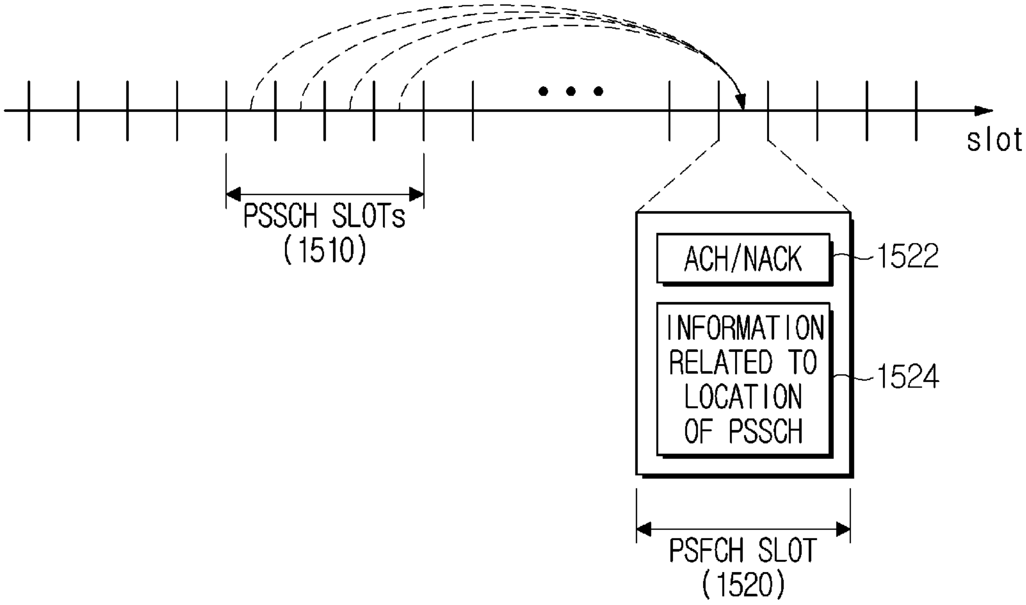
FIG. 15 illustrates a timing relationship between a data signal and a feedback signal in a wireless communication system according to an embodiment of the present disclosure.

FIG. 15 illustrates a timing relationship between a data signal and a feedback signal in a wireless communication system according to an embodiment of the present disclosure. Referring to FIG. 15, a feedback signal for data transmitted through a plurality of PSSCH slots 1510 may be multiplexed in one PSFCH slot 1520. That is, a feedback signal corresponding to data transmitted in at least one of the plurality of PSSCH slots 1510 belonging to one group is transmitted in the PSFCH slot 1520. In this case, the feedback signal transmitted in the PSFCH slot 1520 includes ACK/NACK 1522 and further includes information 1524 related to the location of the PSSCH. Since the plurality of PSSCH slots 1510 corresponding to the PSFCH slot 1520 may be identified by the correspondence relationship shown in FIG. 15, the information 1524 related to the location of the PSSCH may indicate the location of the at least one slot in which data is transmitted, by specifying at least one of four PSSCH slots 1510. Hereinafter, a more specific embodiment of the information 1524 related to the location of the PSSCH will be described.

In performing sidelink communication, the terminal, which has received the PSFCH, determines whether the received PSFCH is valid feedback based on a resource pool used to transmit the data, SCI and a transmission time point, in order to identify that the corresponding PSFCH is feedback on the PSSCH transmitted thereby. At this time, if a common configuration is applied to a starting subchannel and a source ID (e.g., $P_{ID}$) of the PSSCH transmitted in the resource pool and SCI, the location of the PSSCH resource of another terminal may be inferred. According to an embodiment, the information for sensing described with reference to FIGS. 12 to 15, that is, information related to the location of the PSSCH (e.g., information 1524) may be defined based on the above description, and may be referred to as an 'SFRI (sidelink feedback resource indication)'.

The SFRI may be received by a adjacent terminal to enable a resource selection operation. To this end, by using a directional beam used for millimeter wave communication, transmission of the SFRI may be possible in all directions or a plurality of directions. According to the hardware capability of the terminal, when beams may not be simultaneously formed in a plurality of directions or the SFRI is transmitted in more directions than the number of simultaneously formable beams, repetitive transmission through two or more HARQ transmission instances is required. For repetitive transmission, a slot-wise HARQ-ACK repetition function of the PSFCH transmitting HARQ-ACK may be used.

According to the current 5G NR standard, the number of HARQ-ACK repetitions is dependent on a PSFCH period. Since the current standard defines the value of the PSFCH period as {1, 2, 4}, a maximum of 4 repetitions is possible. In the case of omnidirectional transmission using beams having a granularity of 45 degrees as shown in FIG. 12, 8 repetitions are required. For this, 8 or more values are required to be added as a configurable value of the PSFCH period. Referring to FIG. 12, using the SFRI transmitted from the terminal B 1210-2, the terminal C 1210-3 may identify the transmission timing or the slot location of the PSSCH received by the terminal B 1210-2, and information on the number of PSSCHs received at each timing may be identified. If step 5) of the PSSCH resource selection procedure defined in clause 8.1.4 of 3GPP TS 38.214 is applied, the terminal C 1210-3 may select an available PSSCH resource for data transmission.

Variables used below to describe embodiments using the SFRI and parameters defined in the standards corresponding to the parameters are summarized as shown in Table 9 below.

TABLE 9

| Variable | Parameter in standard | Message or IE including parameter | Description |
|---|---|---|---|
| $N_{subch}$ | sl-NumSubchannel-r16 | SL-ResourcePool-r16 | Number of subchannels used to determine PSFCH resource as configuration parameter of PSFCH which is feedback channel for received PSCCH/PSSCH |
| $N_{PSSCH}^{PSFCH}$ | sl-PSFCH-Period-r16 | SL-PSFCH-Config-r16 | PSFCH transmission period |
| $M_{PRB,set}^{PSFCH}$ | sl-PSFCH-RB-Set-r16 | SL-PSFCH-Config-r16 | RB set bitmap for defining RB used to transmit HARQ-ACK in PSFCH |
| $N_{CS}^{PSFCH}$ | sl-NumMuxCS-Pair-r16 | SL-PSFCH-Config-r16 | cyclic shift value for multiplexing HARQ feedback information of multiple users |
| $N_{subch}^{PSSCH}$ | Frequency resource assignment | SCI format 0-1 | Starting point of PSSCH subchannel and the number of subchannels |
| $P_{ID}$ | Source ID | SCI format 0-2 | Sender identification information |

Figure 16:
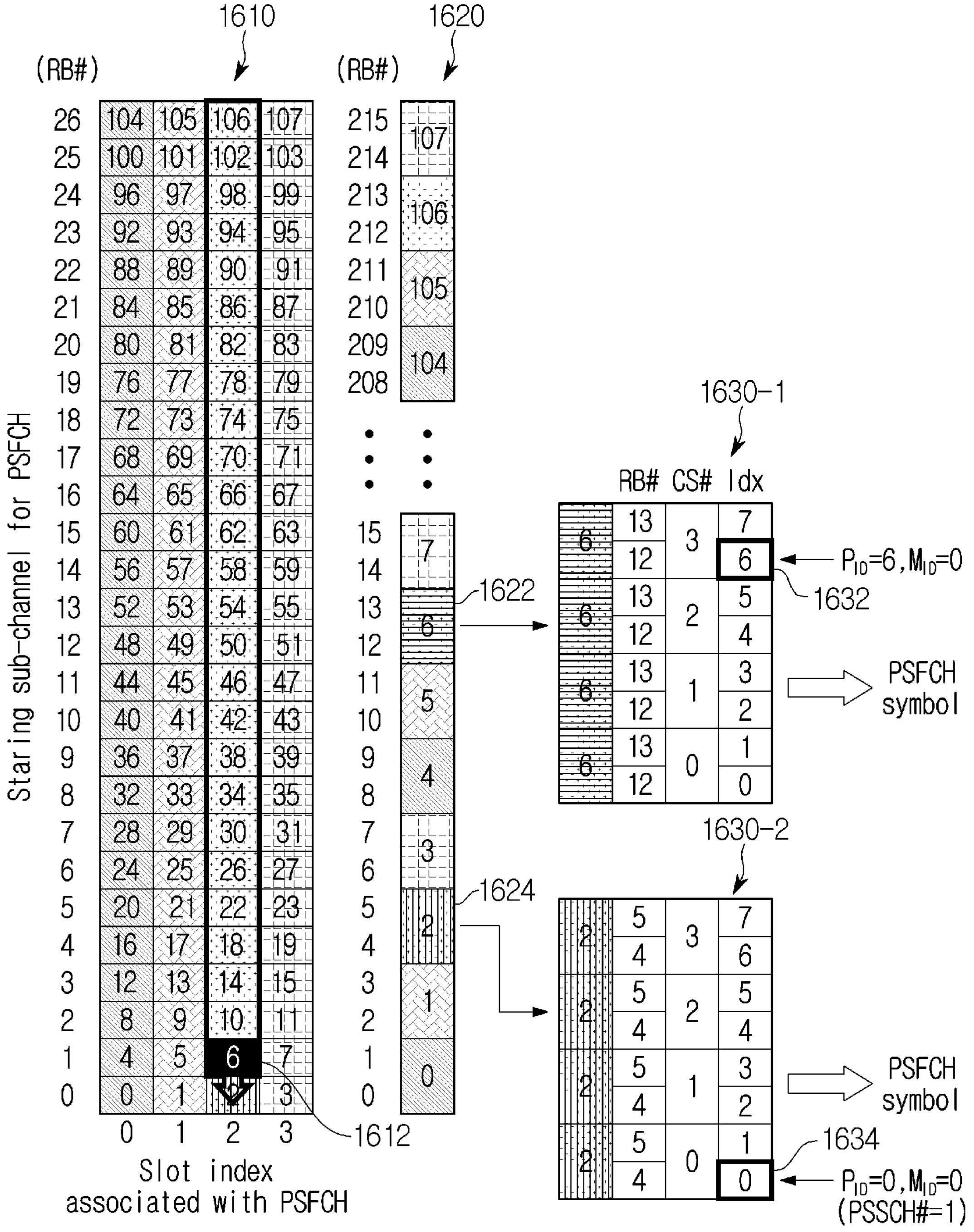
FIG. 16 illustrates an example of a structure of a physical sidelink shared channel (PSSCH) and a physical sidelink feedback channel (PSFCH) and an SFRI in a wireless communication system according to an embodiment of the present disclosure.

When operating in unicast mode, the starting subchannel is 1, and the slot index for receiving the PSCCH/PSSCH within the PSFCH period is 2, the structure of the PSSCH and the PSFCH and an example of the SFRI are shown in FIG. 16 below.

FIG. 16 illustrates an example of a structure of a physical sidelink shared channel (PSSCH) and a physical sidelink feedback channel (PSFCH) and an SFRI in a wireless communication system according to an embodiment of the present disclosure. In the example of FIG. 16, variables related to the structure of the PSSCH and the SFRI are shown in Table 10 below.

TABLE 10

| | | SFRI | PSSCH |
|---|---|---|---|
| RRC | $M^{PSFCH}_{PRB,set}$ | 216 | 216 |
| | $N_{subch}$ | 27 | 27 |
| | $N^{PSFCH}_{PSSCH}$ | 4 | 4 |
| | $N^{PSFCH}_{CS}$ | 4 | 4 |
| | $N^{PSFCH}_{type}$ | 1 | 1 |
| | $M^{PSFCH}_{subch,slot}(=M^{PSFCH}_{PRB,set}/(N_{subch}\times N^{PSFCH}_{PSSCH})$ | 2 | 2 |
| | $R^{PSFCH}_{PRB,CS}(=N^{PSFCH}_{type}\times M^{PSFCH}_{subch,slot}\times N^{PSFCH}_{CS})$ | 8 | 8 |
| | sl-subchannelSize-r16 | 10 | 10 |
| SCI | start-Subchannel (SCI 0-1) | 0 (fixed) | 1 |
| | $P_{ID}$ | 0 (fixed) | 6 |
| SCI | $M_{ID}$ (0 in case of unicast mode) | 0 | 0 |
| SCI | $N^{PSSCH}_{subch}$ | — | — |
| SCI | slot for PSSCH | 2 | 2 |

In table 10, $$M^{PSFCH}_{subch,slot}$$

is the number of RBs occupied by one slot and one subchannel, $$R^{PSFCH}_{PRB,CS}$$

is the number of values expressible using one RB of the PSFCH, $M_{ID}$ is group member identification information and is set to 0 in the case of unicast. In the example of Table 10, $$M^{PSFCH}_{subch,slot}$$

is 2. In the example of Table 10, code division multiplex (CDM) using four cyclic shift (CS) values is applied and thus $$R^{PSFCH}_{PRB,CS}$$

is 8.

Referring to FIG. 16, a PSSCH region 1610 includes 4 slots on the time axis and 27 subchannels on the frequency axis. Subchannels included in the PSSCH region 1610 may be indexed from 0 to 107, and at least one subchannel may constitute one PSSCH. A PSFCH region 1620 corresponding to the PSSCH region 1610 includes one slot on the time axis and 107 subchannels on the frequency axis, that is, 216 RBs. Subchannels included in the PSFCH region 1620 may be indexed from 0 to 107, and at least one subchannel may constitute one PSFCH.

In the PSSCH region 1610, the PSSCH is transmitted through subchannel #6 1612 of slot index 2 and starting subchannel index 1. Accordingly, in the PSFCH region 1620, ACK/NACK is transmitted through subchannel #6 1622 corresponding to subchannel #6 1612. In this case, subchannel #6 1622 includes eight resources 1630-1 divided by a combination of RB and CS. An index of a resource, to which ACK/NACK will be mapped, among the eight resources 1630-1 is based on $P_{ID}$ and $M_{ID}$, and is, for example, determined to be $$(P_{ID}+M_{ID})\%\ R^{PSFCH}_{PRB,CS}.$$

When $P_{ID}$ is 6 and $M_{ID}$ is 0, ACK/NACK is mapped to the resource 1631 of index 6. Since the resource 1632 corresponds to RB index 12 and CS index 3, ACK/NACK information is multiplied by CS #3 and then transmitted through RB #12.

In addition to ACK/NACK information, the SFRI is transmitted. Referring to Table 10, $P_{ID}$ and start-Subchannel for the SFRI are fixed to '0'. The SFRI is dependent on the received PSSCH, and, accordingly, among the resources in slot #2 in which the PSSCH is received, the SFRI is transmitted through subchannel #2 1624 corresponding to the resource of starting subchannel index 0. Similar to subchannel #6 1622, subchannel #2 1624 includes eight resources 1630-2 divided by a combination of RB and CS. Among the eight resources 1630-2, the resource 1634 to which the SFRI will be mapped is determined by $P_{ID}$ and $M_{ID}$, $P_{ID}$ for the SFRI is 0, and $M_{ID}$ for the SFRI is set based on the number of PSSCHs received in the corresponding slot. For example, the values 0, 1, . . . , $$R^{PSFCH}_{PRB,CS}-2,\ R^{PSFCH}_{PRB,CS}-1$$

of $M_{ID}$ denote 1, 2, . . . , $$R^{PSFCH}_{PRB,CS}-1,\ R^{PSFCH}_{PRB,CS}$$

PSSCHs, respectively. In the case of FIG. 16, since one PSSCH is received in the slot of index 2, no for the SFRI is set to '0'. Accordingly, the SFRI is mapped to the resource 1634 of index 0.

As a result, in the PSFCH region 1620, by mapping signals multiplexed with CS #0 and CS #3 to RB #4 and RB #12, the SFRI and ACK/NACK are expressed. In other words, in the PSFCH symbol included in the PSFCH region 1620, that is, in the feedback signal, one sequence in which CS #3 is applied to RB #12 is transmitted for HARQ-ACK/NACK information and another sequence in which CS #0 is applied to RF #4 is transmitted for SFRI.

Accordingly, the terminal, which has transmitted the PSSCH, may identify the HARQ-ACK information determined using the SFRI and its source ID. In addition, the adjacent terminal, which has not transmitted the PSSCH, may identify the adjacent PSSCH transmission state by decoding a common resource in the PSFCH of every slot along with resource sensing, and perform resource selection. That is, the adjacent terminal may estimate the location and number of PSSCHs received by the terminal, which has transmitted the PSFCH, by detecting the SFRI using the fixed starting subchannel index and the fixed source ID value.

Figure 17:
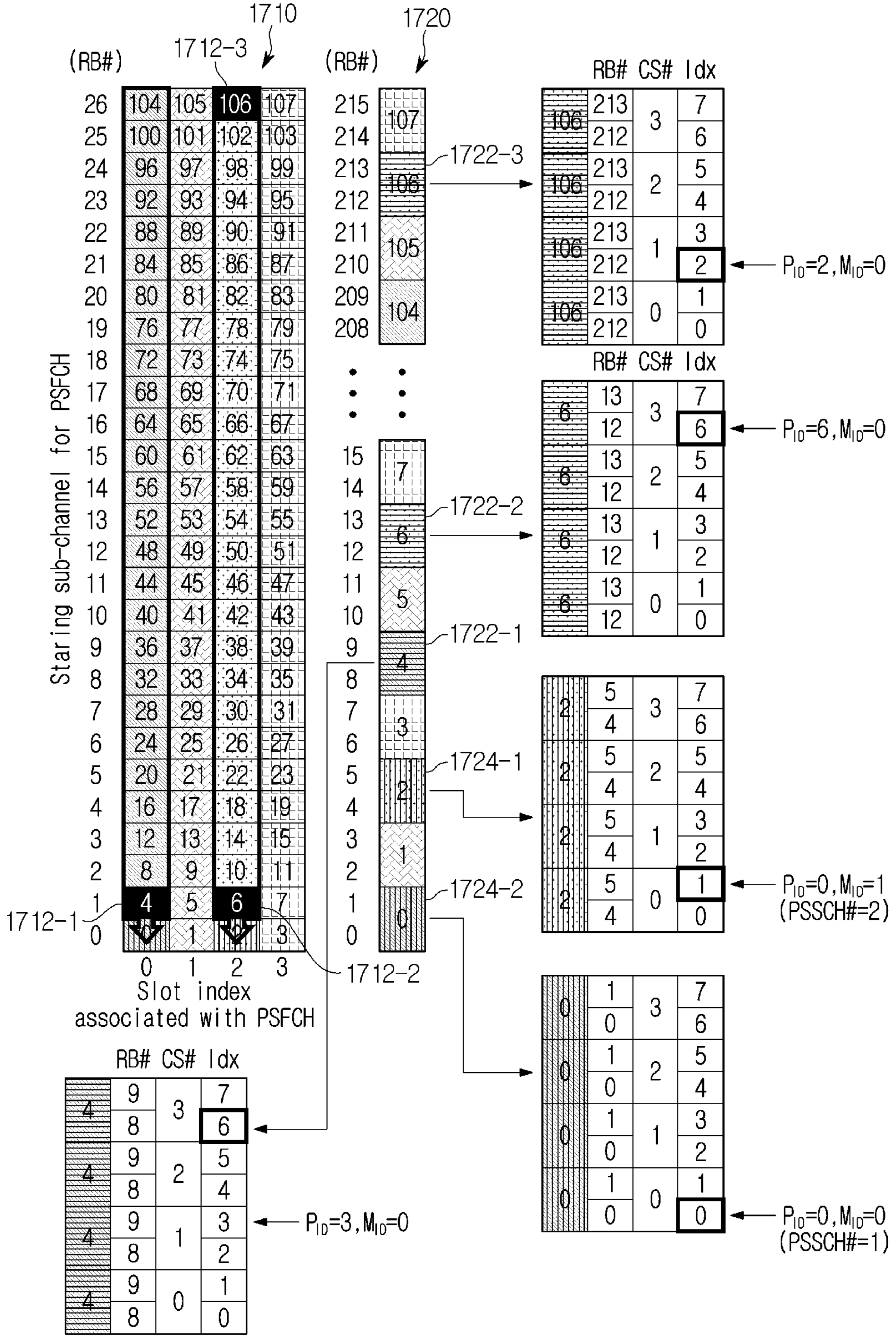
FIG. 17 illustrates another example of a structure of a PSSCH and a PSFCH and an SFRI in a wireless communication system according to an embodiment of the present disclosure.

FIG. 17 illustrates another example of a structure of a PSSCH and a PSFCH and an SFRI in a wireless communication system according to an embodiment of the present disclosure. In the example of FIG. 17, variables related to the structure of the PSSCH and the SFRI are shown in Table 11 below.

TABLE 11

| | | SFRI1 | PSSCH1 | PSSCH2 | SFRI2 | PSSCH3 |
|---|---|---|---|---|---|---|
| RRC | $M^{PSFCH}_{PRB,set}$ | 216 | 216 | 216 | 216 | 216 |
| | $N_{subch}$ | 27 | 27 | 27 | 27 | 27 |
| | $N^{PSFCH}_{PSSCH}$ | 4 | 4 | 4 | 4 | 4 |
| | $N^{PSFCH}_{CS}$ | 4 | 4 | 4 | 4 | 4 |
| | $N^{PSFCH}_{type}$ | 1 | 1 | 1 | 1 | 1 |
| | $M^{PSFCH}_{subch,slot}$ | 2 | 2 | 2 | 2 | 2 |
| | $R^{PSFCH}_{PRB,CS}$ | 8 | 8 | 8 | 8 | 8 |
| | sl-subchannelSize-r16 | 10 | 10 | 10 | 10 | 10 |
| SCI | start-Subchannel | 0 | 1 | 26 | 0 | 1 |
| | $P_{ID}$ | 0 | 6 | 2 | 0 | 3 |
| | $M_{ID}$ | 1 | 0 | 0 | 0 | 0 |
| SCI | $N^{PSSCH}_{subch}$ | — | — | — | — | — |
| SCI | slot for PSSCH | 2 | 2 | 2 | 0 | 0 |

Referring to FIG. 17, in a PSSCH region 1710, one PSSCH in subchannel #4 1712-1 in slot #0 and two PSSCHs in subchannel #6 1712-2 and subchannel #106 1712-3 in slot #2 are received. Accordingly, SFRI2 corresponding to slot #0 and SRFI1 corresponding to slot #2 are generated. In addition, in a PSFCH region 1720, three ACK/NACK sequences are transmitted through subchannel #4 1722-1, subchannel #6 1722-2 and subchannel #106 1722-3 and two SFRIs are transmitted through subchannel #2 1724-1 and subchannel #0 1724-2. At this time, since two PSSCHs are received in slot #2 corresponding to SFRI1, no for SFRI1 is set to 1. The terminal, which has received the PSSCHs, may transmit the SFRI to the adjacent terminal by forming 4 directional beams using HARQ-ACK repetition during the PSFCH period including 4 slots.

Figure 18:
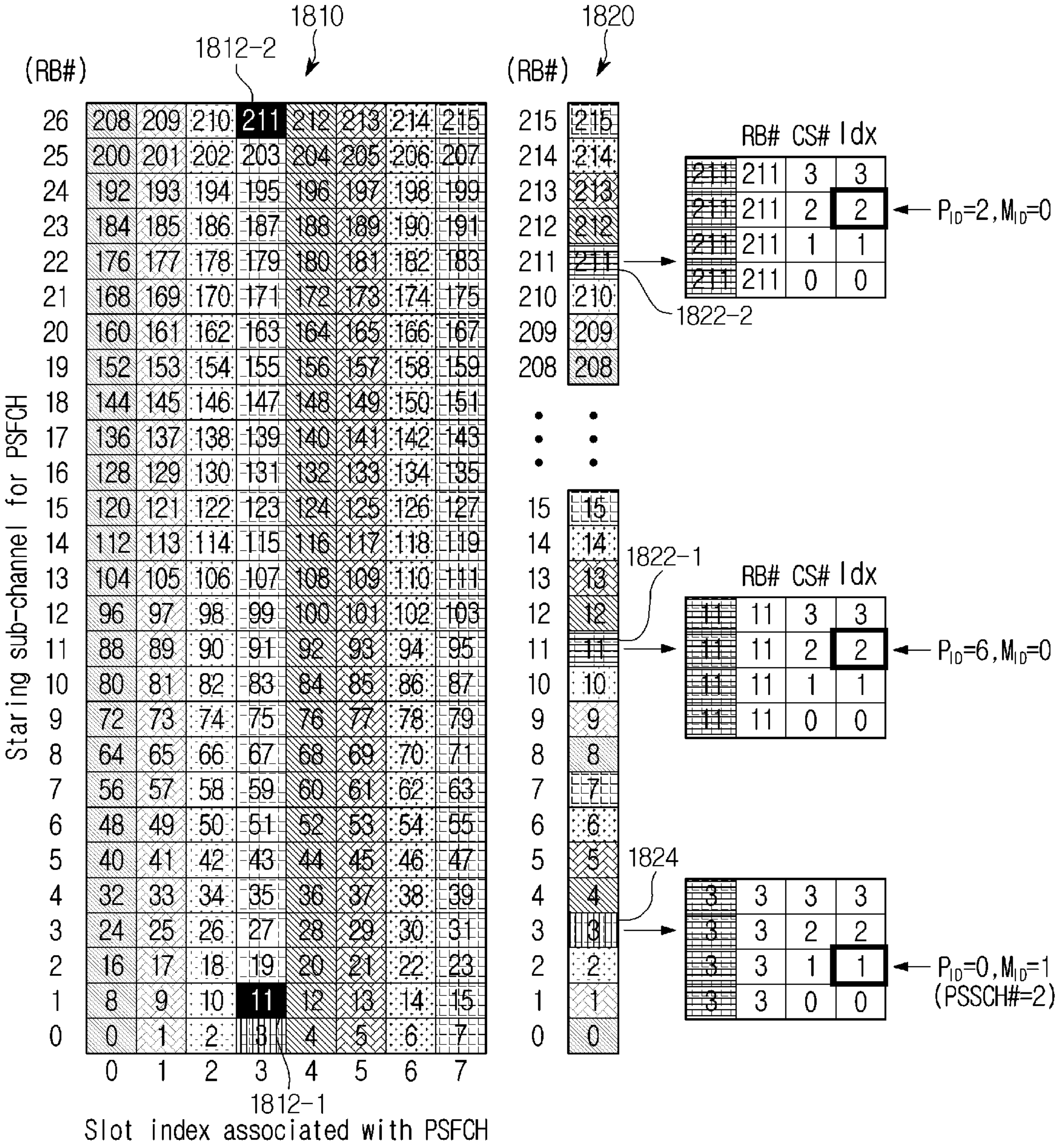
FIG. 18 illustrates another example of a structure of a PSSCH and a PSFCH and an SFRI in a wireless communication system according to an embodiment of the present disclosure.

FIG. 18 illustrates another example of a structure of a PSSCH and a PSFCH and an SFRI in a wireless communication system according to an embodiment of the present disclosure. In the example of FIG. 18, variables related to the structure of the PSSCH and the SFRI are shown in Table 12 below.

TABLE 12

| | | SFRI1 | PSSCH1 | PSSCH2 |
|---|---|---|---|---|
| RRC | $M^{PSFCH}_{PRB,set}$ | 216 | 216 | 216 |
| | $N_{subch}$ | 27 | 27 | 27 |
| | $N^{PSFCH}_{PSSCH}$ | 8 | 8 | 8 |
| | $N^{PSFCH}_{CS}$ | 4 | 4 | 4 |
| | $N^{PSFCH}_{type}$ | 1 | 1 | 1 |
| | $M^{PSFCH}_{subch,slot}$ | 1 | 1 | 1 |
| | $R^{PSFCH}_{PRB,CE}$ | 4 | 4 | 4 |
| | sl-subchannelSize-r16 | 10 | 10 | 10 |
| SCI | start-Subchannel | 10 | 1 | 26 |
| | $P_{ID}$ | 0 | 6 | 2 |
| | $M_{ID}$ | 1 | 0 | 0 |
| SCI | $N^{PSSCH}_{subch}$ | — | — | — |
| SCI | slot for PSSCH | 3 | 3 | 3 |

Referring to FIG. 18, in a PSSCH region 1810, two PSSCHs are received in subchannel #11 1812-1 and subchannel #211 1812-2 in slot #3. Accordingly, an SFRI corresponding to slot #3 is generated. As a result, in a PSFCH region 1820, two ACK/NACK sequences are transmitted through resource block (RB) #11 1822-1 and resource block #211 1822-2, and one SFRI is multiplexed in a PSFCH symbol through resource block #3 1824. At this time, since two PSSCHs are received in slot #3 corresponding to the SFRI, $M_{ID}$ for the SFRI is set to 1. The terminal, which has received the PSSCHs, may transmit the SFRI to the adjacent terminal, by forming 8 directional beams using HARQ-ACK repetition during the PSFCH period including 8 slots.

Figure 19:
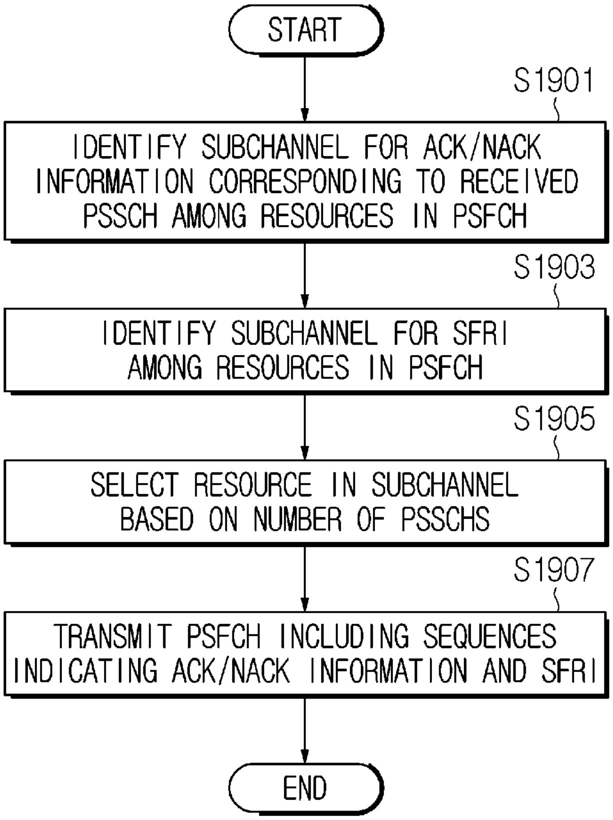
FIG. 19 illustrates an example of a procedure for transmitting a feedback signal including an SFRI in a wireless communication system according to an embodiment of the present disclosure.

FIG. 19 illustrates an example of a procedure for transmitting a feedback signal including an SFRI in a wireless communication system according to an embodiment of the present disclosure. FIG. 19 illustrates a method of operating a terminal (e.g., the terminal B 1210-2) performing sidelink communication with another terminal (e.g., the terminal A 1210-1).

Referring to FIG. 19, in step S1901, the terminal identifies a subchannel for ACK/NACK information corresponding to the received PSSCH among resources in the PSFCH. A plurality of PSSCH slots may correspond to one PSFCH slot, and resources in the plurality of PSSCH slots may correspond one-to-one with subchannels in the PSFCH slot. Based on the one-to-one correspondence, the terminal may identify a subchannel for ACK/NACK information. In this case, ACK/NACK information may be generated as many as the number of received PSSCHs, and when receiving a plurality of PSSCHs, the terminal may identify a plurality of subchannels. In addition, although not shown in FIG. 19, the terminal may select a resource to which ACK/NACK information will be mapped based on control information (e.g., source ID) associated with the PSSCH received in the identified subchannel.

In step S1903, the terminal identifies the subchannel for the SFRI among the resources in the PSFCH. A subchannel for the SFRI may be predefined. One subchannel for the SFRI may be defined per PSSCH slot. That is, when a plurality of PSSCH slots correspond to one PSFCH slot, subchannels for SFRI as many as the number of PSSCH slots may be allocated in the PSFCH. Accordingly, the terminal identifies the subchannel for the SFRI corresponding to the PSSCH slot corresponding to the ACK/NACK information. Alternatively, the terminal identifies a subchannel in the PSFCH slot corresponding to a predefined location among resources included in the slot in which the PSSCH is received.

In step S1905, the terminal selects a resource in the subchannel based on the number of PSSCHs. The subchannel for SFRI is selected based on the location of the slot in which the PSSCH is received, and, among the resources in the subchannel, the resource to which the SFRI will be mapped is determined based on the number of PSSCHs received in the corresponding slot. Here, the resource may be specified by the location of the RB in the subchannel and the applied CS value.

In step S1907, the terminal transmits a PSFCH including sequences indicating ACK/NACK information and an SFRI. That is, the terminal maps at least one sequence defined to indicate ACK/NACK information and a sequence defined to indicate the SFRI to selected resources, and then transmits a feedback signal including the sequences through the PSFCH. In this case, the PSFCH may be transmitted in different directions using a plurality of transmit beams.

With reference to FIGS. 16 to 19, as an example of information for sensing included in the feedback signal, the SFRI has been described. The SFRI indicates, in units of slots, a point in time when the terminal, which has received the PSCCH, transmits the PSCCH to the adjacent terminal through the PSFCH. On the other hand, PSCCH SCI format 1-A delivers a TRIV (time resource indicator value) in the 'Time resource assignment' field. TRIV consists of 5 bits or 9 bits, and provides information on reserved slots for HARQ retransmission or SPS (semi-persistent scheduling). According to a higher layer parameter sl-MaxNumPerReserve (hereinafter '$N_{MAX}$') indicating a maximum number of reserved resources, the length of 'Time resource assignment' may vary. For example, when $N_{MAX}$ is 2, one or two actual resources are transmitted, and the length of the 'Time resource assignment' field is 5 bits. For example, when $N_{MAX}$ is 3, one, two, or three actual resources are transmitted, and the length of the 'Time resource assignment' field is 9 bits. Accordingly, information on up to three PSSCH transmission timings (e.g., slots) may be identified through the TRIV. Accordingly, the present disclosure proposes embodiments for transmitting a TRIV to a adjacent terminal through a feedback signal.

Similar to the above-described SFRI, the TRIV is transmitted through a feedback signal using a plurality of transmit beams based on a PSFCH repetition function. However, unlike the SFRI, the TRIV according to various embodiments requires a new PSFCH format different from the PSFCH format defined in the current standard. Before describing a specific embodiment, the TRIV will be described as follows.

Figure 20:
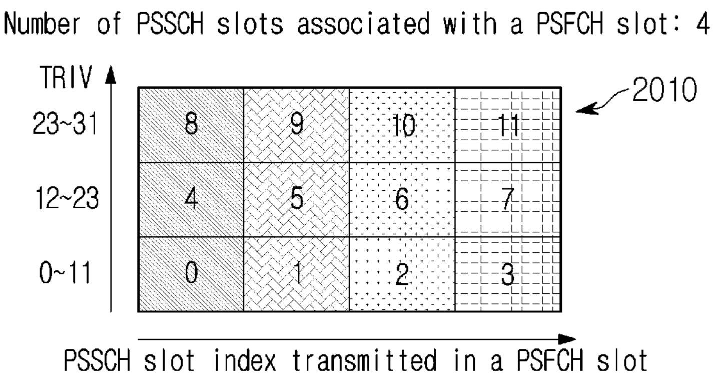
FIG. 20 illustrates an example of mapping between a time resource indicator value (TRIV) and virtual resources in a wireless communication system according to an embodiment of the present disclosure.

If $N_{MAX}$ is 2, the TRIV has a length of 5 bits. A 5-bit TRIV may represent one of values of 0 to 31. The 32 values may be mapped to virtual resources having a structure similar to a resource used for PSFCH resource selection. For example, virtual resources to which TRIV values are mapped are shown in FIG. 20 below. FIG. 20 illustrates an example of mapping between a TRIV and virtual resources in a wireless communication system according to an embodiment of the present disclosure. The resources 2010 illustrated in FIG. 20 do not occupy an actual time-frequency resource in order to transmit a signal, but are virtually defined in order to transmit TRIV information similar to the PSFCH. Referring to FIG. 20, the horizontal axis of the virtual resources 2010 represents the slot index, and the vertical axis represents the TRIV value. 32 TRIV values are mapped to each of the slots corresponding to the number (e.g., 4) of PSSCH slots corresponding to the PSFCH slot. In each slot, 32 TRIV values are grouped by 12, and one group including 12 TRIV values is mapped to one resource. By mapping TRIV values to resources as shown in FIG. 20, TRIV information may be transmitted through the PSFCH based on a method similar to transmitting ACK/NACK information for the PSSCH. According to an embodiment, TRIV information may be transmitted as shown in FIG. 21 below.

Figure 21:
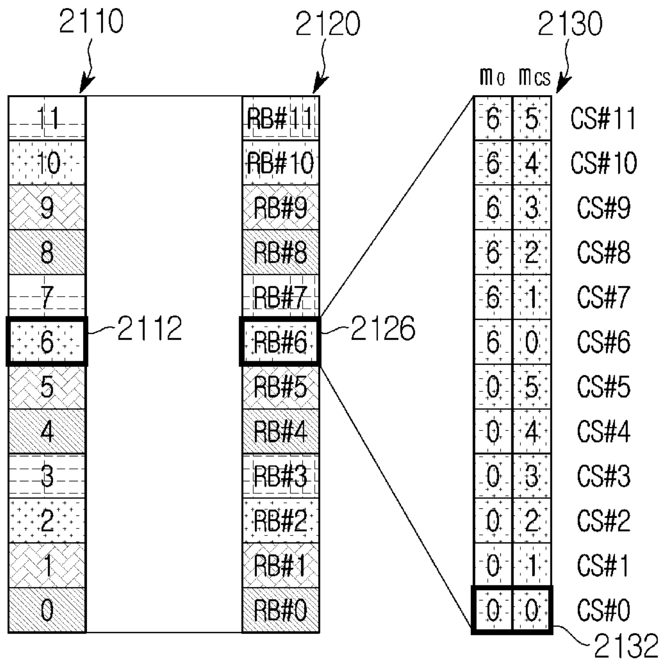
FIG. 21 illustrates an example of a PSFCH structure indicating a TRIV in a wireless communication system according to an embodiment of the present disclosure.

FIG. 21 illustrates an example of a PSFCH structure indicating a TRIV in a wireless communication system according to an embodiment of the present disclosure. FIG. 21 illustrates a part of a PSFCH defined to deliver TRIV information, and shows a mapping relationship between 12 RBs 2120 for expressing a TRIV value and CSs applied to a PSFCH sequence. Referring to FIG. 21, 12 RBs 2120 corresponding to 12 virtual resources 2110 are assigned. According to an embodiment, the 12 RBs 2120 may be contiguous RBs adjacent to RBs for expressing ACK/NACK information in the PSFCH. According to another embodiment, the starting locations of the 12 RBs 2120 in the PSFCH may be indicated by higher layer signaling (e.g., 'starting_RB_index'). Since 12 CS values 2130 such as CS #0 to CS #11 may be applied in each of the 12 RBs 2120, 12 different PSFCH sequences per RB may be distinguished.

For example, if the TRIV value is 12, and the PSSCH is received in slot #3, resource #6 2112 is selected to represent the TRIV. Since resource #6 2112 corresponds to RB #6 2126 among 12 RBs 2120, a sequence for expressing the TRIV is transmitted through RB #6 2126. At this time, since the TRIV is 12 and 12 is the first value among values mapped to resource #6 2112, CS #0 2132 is applied.

If $N_{MAX}$ is 3, the TRIV has a length of 9 bits. The TRIV having a length of 9 bits may have one of 0 to 511. In this case, since a larger number of values than 36 values that may be expressed through mapping with virtual resources as shown in FIG. 20 shall be expressed, more RBs than the example of FIG. 21 are required. In this case, it is not easy to deliver the TRIV in the form of PSFCH format 0 and FDM in the same symbol as the PSFCH symbol. Accordingly, the present disclosure proposes an embodiment in which a TRIV is expressed using two sequences without using more RBs than the example of FIG. 21.

Figure 22:
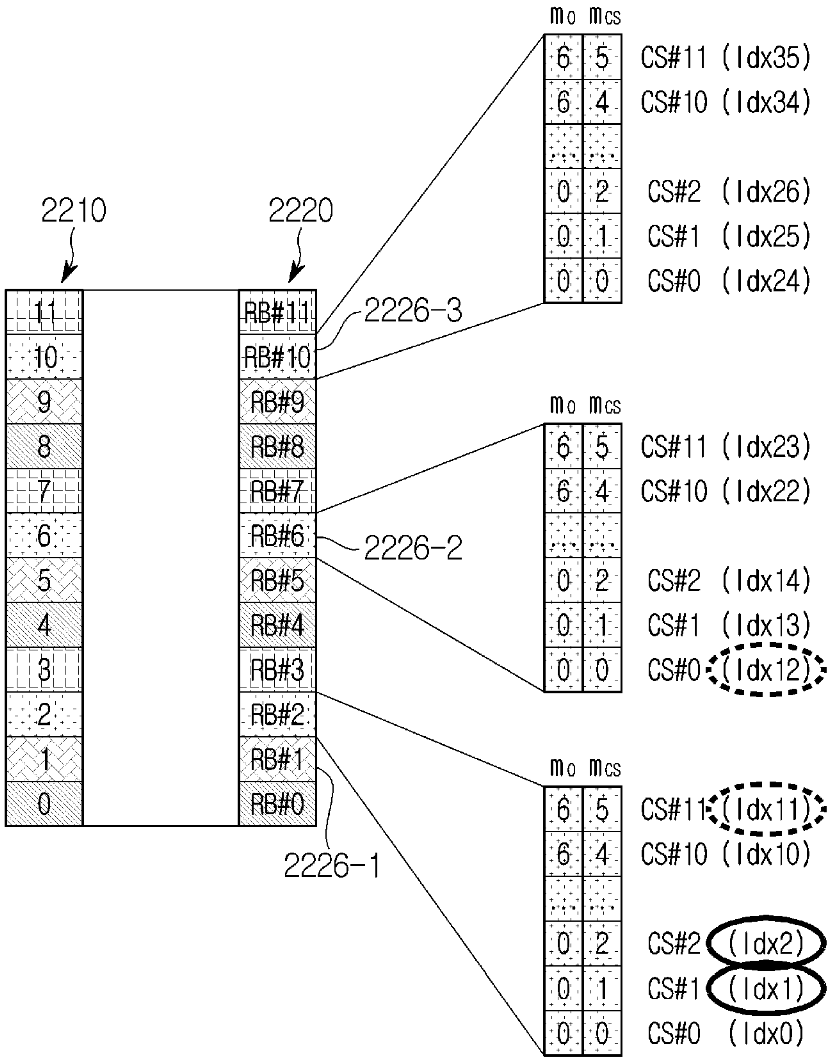
FIG. 22 illustrates another example of a PSFCH structure indicating a TRIV in a wireless communication system according to an embodiment of the present disclosure.

FIG. 22 illustrates another example of a PSFCH structure indicating a TRIV in a wireless communication system according to an embodiment of the present disclosure. FIG. 22 illustrates index assignment for expressing a TRIV having a length of 9 bits. Referring to FIG. 22, 12 RBs 2220 corresponding to 12 virtual resources 2210 are assigned, and RB #2 2226-1, RB #6 2226-2 and RB #10 2226-3 corresponds to slot #2. In addition, RB #0, RB #4, and RB #8 correspond to the PSCCH transmitted in slot #0, RB #1, RB #5 and RB #9 correspond to slot #1, and RB #3, RB #7 and RB #1 corresponds to slot #0. Since 12 CSs are applicable to each of the three RBs 2226-1 to 2126-3 corresponding to slot #2, if one sequence is used in the three RBs 2226-1 to 2226-3, one of 36 resources (e.g., idx0 to idx35) may be designated. Accordingly, a combination of two sequences may represent a maximum of 1296 (=36×36) values for one slot. An example of a correspondence relationship between a combination of two sequences and TRIVs is shown in FIG. 23 below.

FIG. 23 illustrates an example of TRIVs indicated by a combination of two sequences in a wireless communication system according to an embodiment of the present disclosure. As shown in FIG. 23, a method of selecting two resources from among 31 independent resources based on locations t1 and t2 of scheduled slots used to calculate a TRIV when $N_{MAX}$ is 3 may be used. Referring to FIG. 23, the horizontal axis and the vertical axis are selected by indices of two resources, and, between the two resources, a small index corresponds to t1 and a large index corresponds to t2. For example, when expressing a TRIV value 32, t1 is selected as 1, t2 is selected as 2, and the corresponding resources are CSs of idx1 and idx2 in FIG. 22. That is, to express the TRIV value 32, CS #1 and CS #2 of RB #2 corresponding to idx1 and idx2 are applied. Similarly, when expressing ae TRIV value 42, t1 and t2 are 11 and 12, and CS #11 of RB #2 and CS #0 of RB #6 corresponding to idx11 and idx12 are applied.

Figure 24:
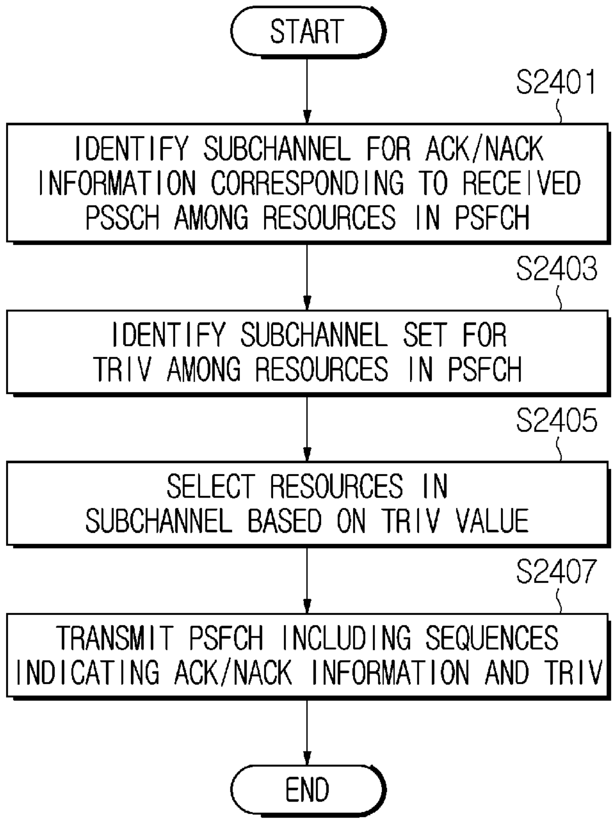
FIG. 24 illustrates an example of a procedure for transmitting a feedback signal including a TRIV in a wireless communication system according to an embodiment of the present disclosure.

FIG. 24 illustrates an example of a procedure for transmitting a feedback signal including a TRIV in a wireless communication system according to an embodiment of the present disclosure. FIG. 24 illustrates a method of operating a terminal (e.g., terminal B 1210-2) performing sidelink with another terminal (e.g., terminal A 1210-1).

Referring to FIG. 24, in step S2401, the terminal identifies a subchannel for ACK/NACK information corresponding to the received PSSCH among resources in the PSFCH. A plurality of PSSCH slots may correspond to one PSFCH slot, and resources in the plurality of PSSCH slots may correspond one-to-one with subchannels in the PSFCH slot. Based on the one-to-one correspondence, the terminal may identify a subchannel for ACK/NACK information. In this case, ACK/NACK information may be generated as many as the number of received PSSCHs, and, when receiving a plurality of PSSCHs, the terminal may identify a plurality of subchannels. In addition, although not shown in FIG. 24, the terminal may select a resource to which ACK/NACK information is mapped based on control information (e.g., source ID) related to the PSSCH received in the identified subchannel.

In step S2403, the terminal identifies a subchannel set for a TRIV among the resources in the PSFCH. The TRIV is expressed using two or more subchannels, and may be transmitted through subchannels defined separately from subchannels for ACK/NACK information transmission. In other words, the TRIV may be transmitted in an area assigned to indicate the TRIV in the PSFCH. One subchannel set for the TRIV may be defined per PSSCH slot. Accordingly, when a plurality of PSSCH slots correspond to one PSFCH slot, subchannel sets for the TRIV as many as the number of PSSCH slots may be assigned in the PSFCH. Accordingly, the terminal identifies the subchannel set for the TRIV corresponding to the PSSCH slot corresponding to the ACK/NACK information.

In step S2405, the terminal selects at least one resource in the subchannel based on the TRIV value. The number of selected resources may vary depending on the range of the TRIV value. For example, when the TRIV value is 0 to 31, one resource may be selected from among the resources in the subchannel set. As another example, when the TRIV value is 0 to 511, two resources may be selected from among the resources in the subchannel set. When two resources are selected, the resources may be selected based on a mapping table defining a correspondence relationship between two indices and TRIV values.

In step S2407, the terminal transmits a PSFCH including sequences indicating ACK/NACK information and the TRIV. That is, the terminal maps at least one sequence defined to indicate ACK/NACK information and a sequence defined to indicate the TRIV to selected resources, and then transmits a feedback signal including the sequences through the PSFCH. In this case, the PSFCH may be transmitted in different directions using a plurality of transmit beams.

According to the above-described various embodiments, the terminal may obtain information on the location of the PSSCH through the feedback signal, and perform resource sensing and selection operations. The various embodiments described above may be applied in the following environment. Since the HARQ-ACK feedback operation is utilized, a mode to which the HARQ procedure is applied among sidelink communication modes (e.g., unicast mode and groupcast mode option 2) is required. In addition, terminals performing sidelink communication and terminals performing resource sensing belong to a terminal cluster sharing the same resource pool configuration. In one terminal cluster, PSFCH transmission time point, timing synchronization, sl-MultiReserveResource-r16, and sl-MaxNumPerReserve-r16 are identically configured. That is, in the operation of the resource pool, full flexibility is limited, and, within the terminal cluster using the same resource pool, the above-described techniques may be operated. To this end, transmission of a cell-specific parameter (e.g., limited-resource-pool-for-beam flag) that may notify that the proposed technique is available may be considered.

The various embodiments described above may be utilized as one method for solving a hidden node problem. Specifically, if the above-described embodiments are applied, without using separate control frames such as request to send (RTS) and clear to send (CTS), other terminals in the vicinity of the transmitting terminal and the receiving terminal may know information on reserved resources which are being used by the transmitting terminal and the receiving terminal and will be used in the future, thereby reducing the possibility of mutual resource collision. In addition, when the above-described embodiments are applied, the possibility of delaying transmission of an emergency message by a network allocation vector (NAV) deferring access of other media which do not directly participate in communication based on the 'Duration' field of a RTS, CTS and data frame may be reduced.

In the case of adopting the RTS/CTS frame exchange procedure used in IEEE 802.11, etc. to solve the hidden node problem in the V2X communication system, control frames (e.g., RTS frame, CTS frame) having a size of about 20 bytes and 14 bytes shall be exchanged before data transmission. Since the exchange of control frames occupies a large amount of transmission capacity, it may hinder achievement of a high data transmission rate. However, most safety-related messages transmitted in the V2X environment generally have a low transmission rate. In this case, the NAV field deferring access to other media based on the 'Duration' field of the RTS frame, the CTS frame, and the data frame may restrict the transmission of the emergency message of the media. In order to solve this problem, the technique using the HARQ feedback signal according to the various embodiments described above may be applied without using separate control frames such as RTS and CTS.

Figure 25:
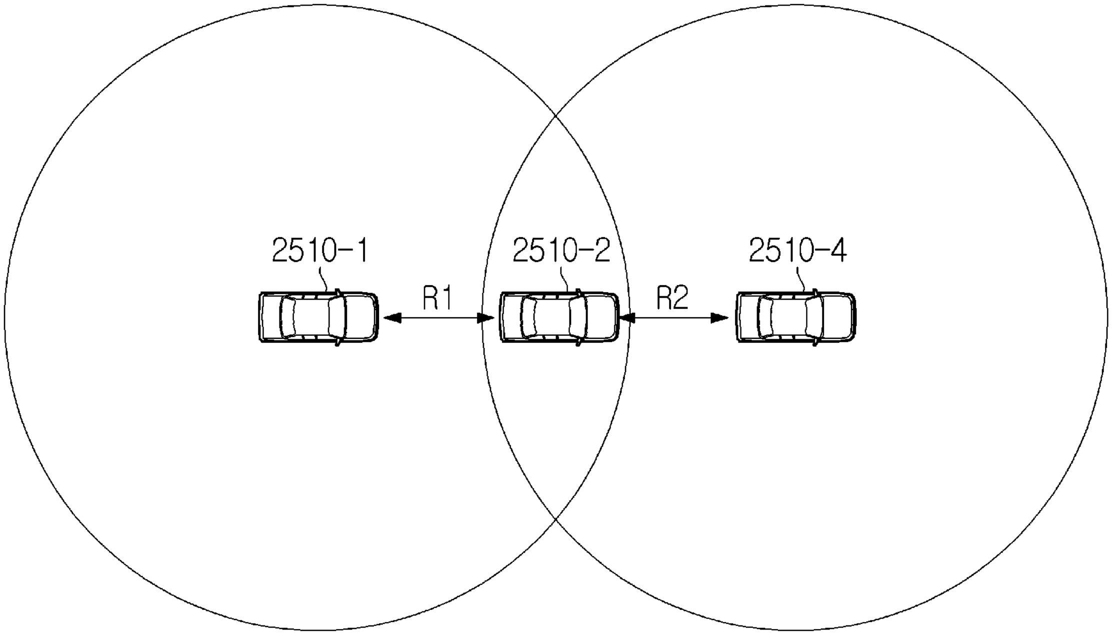
FIG. 25 illustrates an example of a situation in which a hidden node problem may occur in a wireless communication system according to an embodiment of the present disclosure.

FIG. 25 illustrates an example of a situation in which a hidden node problem may occur in a wireless communication system according to an embodiment of the present disclosure. Referring to FIG. 25, terminal A 2510-1 transmits data to terminal B 2510-2 through a resource R1. Terminal C 2510-3 assigns or selects a resource through a resource sensing operation in order to transmit data to terminal B 2510-2. However, since terminal C 2510-3 is located outside the signal coverage of terminal A 2510-1, it may not sense that terminal A 2510-1 uses the resource R1. In this case, terminal C 2510-3 may select the resource R1, and resource collision may occur in the resource R1 being used by terminal A 2510-1.

However, since information (e.g., SFRI, TRIV) related to the location of the PSSCH according to the above-described embodiments is transmitted through a common resource through the same PSFCH when terminal B 2510-2, which has received the PSSCH from terminal A 2510-1, transmits HARQ-ACK through the PSFCH, resource information occupied by the PSSCH may be propagated to adjacent terminals including terminal C 2510 3. In FIG. 25, using the feedback signal transmitted from terminal B 2510-2, terminal C 2510-3 may identify the transmission timing (e.g., slot location) of the PSSCH received by terminal B 2510-2 and the number of PSSCHs received at the timing. In addition, if step 5) of the PSSCH resource selection procedure defined in clause 8.1.4 of the 3GPP TS 38.214 document is applied, terminal C 2510-3 may select a transmittable PSSCH resource.

Figure 26:
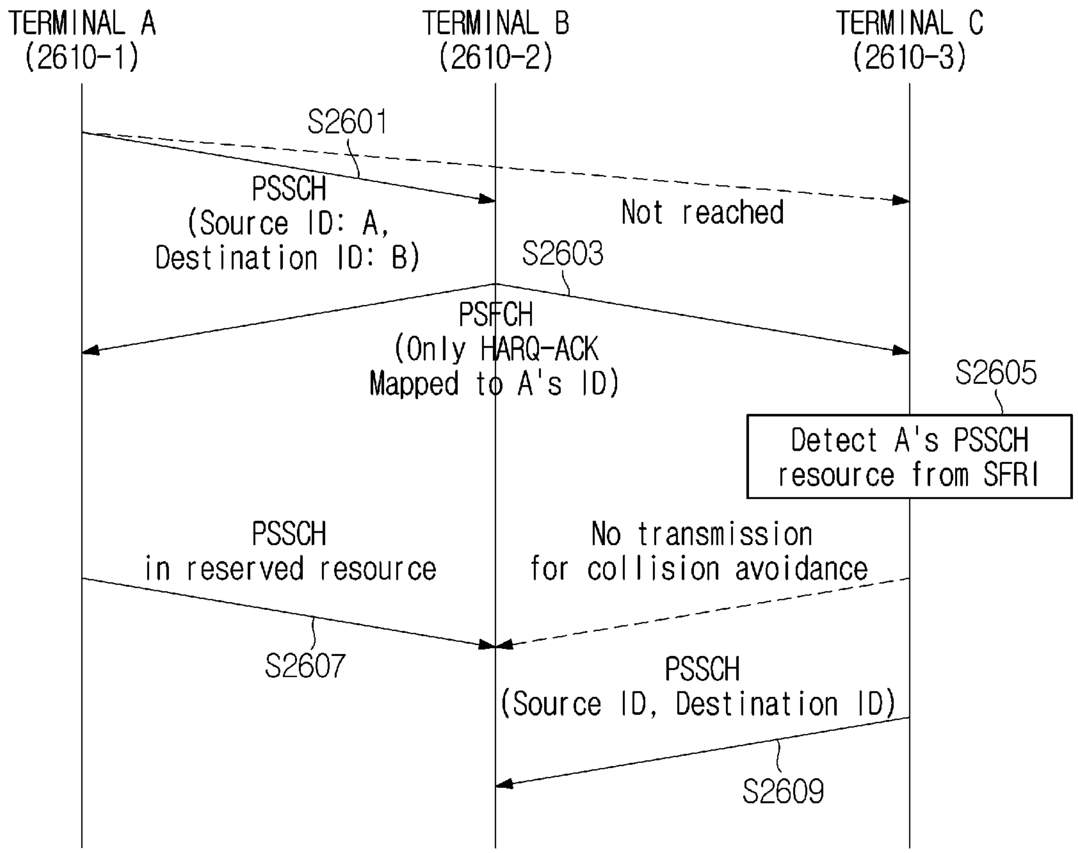
FIG. 26 illustrates an example of a procedure for detecting a hidden node using a feedback signal in a wireless communication system according to an embodiment of the present disclosure.

FIG. 26 illustrates an example of a procedure for detecting a hidden node using a feedback signal in a wireless communication system according to an embodiment of the present disclosure. FIG. 26 illustrates a situation where terminal A 2610-1 and terminal B 2610-2 perform sidelink communication and terminal C 2610-3 performs resource sensing. FIG. 26 illustrates an embodiment in which an SFRI is transmitted.

Referring to FIG. 26, in step S2601, terminal A 2610-1 transmits a PSSCH to terminal B 2610-2. The PSSCH includes control information, and the control information includes identification information of terminal A 2610-1 as a source ID and identification information of terminal B 2610-2 as a destination ID. At this time, since terminal C 2610-3 is outside the coverage of terminal A 2610-1, the PSSCH is not received.

In step S2603, terminal B 2610-2 transmits a PSFCH including a feedback signal for the PSSCH. Since the PSFCH is transmitted using a plurality of transmit beams, it may also be received even by terminal C 2610-3. The feedback signal includes HARQ-ACK/NACK information mapped to identification information of terminal A 2610-1.

In step S2605, terminal C 2610-3 detects the location of the PSCCH resource of terminal A 2610-1 based on the SFRI included in the feedback signal. That is, terminal C 2610-3 extracts a signal mapped to a subchannel for the SFRI from the PSFCH, and identifies a RB, to which the signal is mapped, and the used CS value, thereby detecting the location and number of PSSCHs. Here, the location of the PSSCH includes the location of the PSSCH transmitted in step S2601 and the location of the PSSCH to be used in the future.

In step S2607, terminal A 2610-1 transmits the PSSCH through the reserved resource to terminal B 2610-2. Since terminal C 2610-3 has detected the location of the PSSCH through the PSFCH, a reserved resource may not be selected.

In step S2609, terminal C 2610-3 transmits a PSSCH to terminal B 2610-2. The PSSCH includes control information, and the control information includes a source ID and a destination ID. That is, terminal C 2610-3 may select a collision-free resource based on the sensing result using the PSFCH and transmit data through the selected resource.

Figure 27:
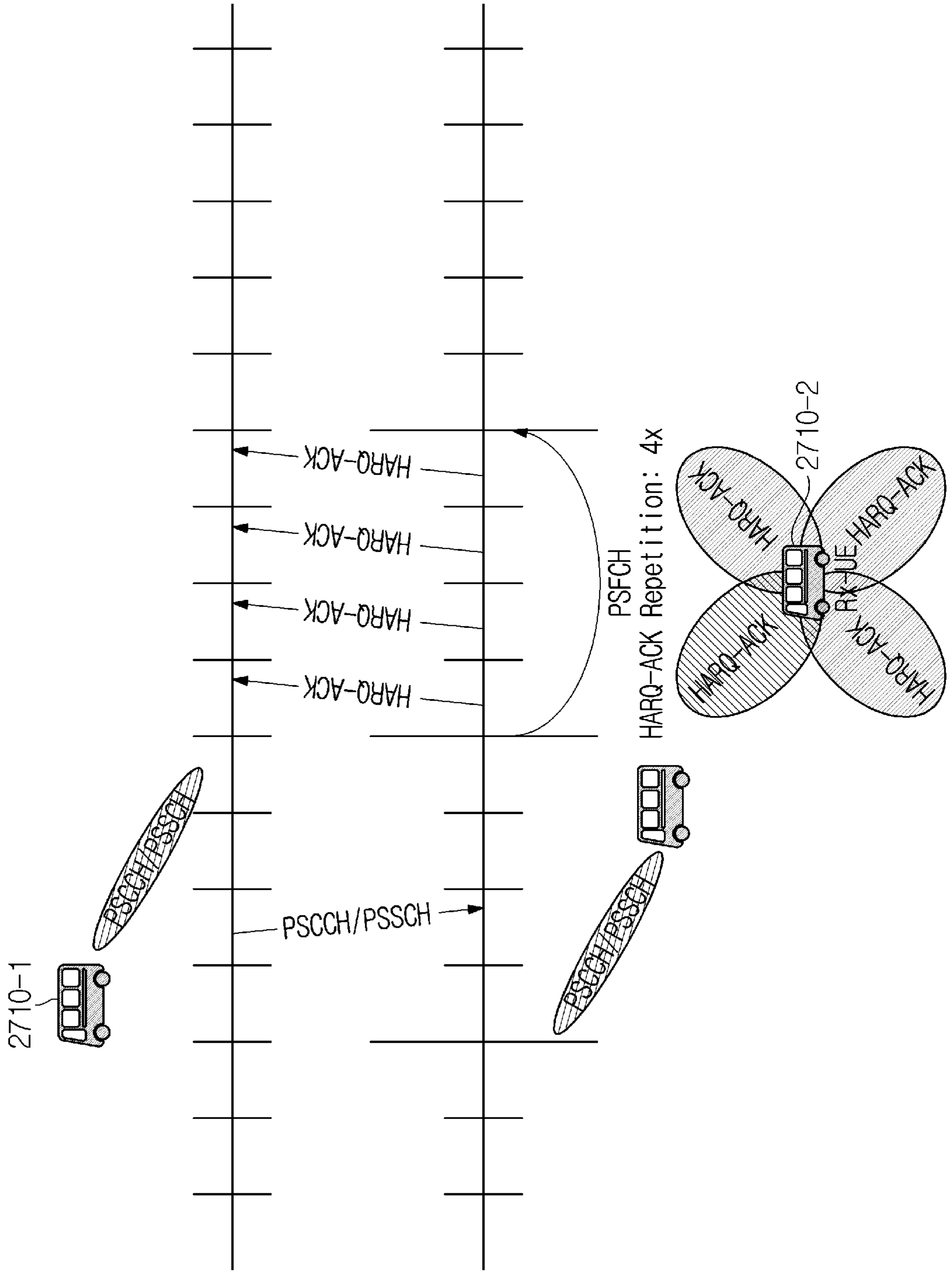
FIG. 27 illustrates an example of signal exchange for resource sensing in a wireless communication system according to an embodiment of the present disclosure.

FIG. 27 illustrates an example of signal exchange for resource sensing in a wireless communication system according to an embodiment of the present disclosure. FIG. 27 illustrates signal exchange in a situation where sl-PSFCH-Period-r16 is set to sl4, sl-MinTimeGapPSFCH-16 is set to sl2, a HARQ-ACK repetition factor is set to 4, terminal B 2710-2 supports four transmit beams, and a repeated transmission interval T0 is set to 1-slot. Referring to FIG. 27, terminal A 2710-1 transmits a PSCCH and a PSSCH. In slots corresponding to the ACK timings corresponding to the PSCCH and the PSSCH, terminal B 2710-2 repeatedly transmits HARQ-ACK information four times. In this case, the HARQ-ACK information is transmitted using different transmit beams, and may be transmitted together with information related to the location of the PSSCH (e.g., SFRI, TRIV) according to various embodiments.

Figure 28:
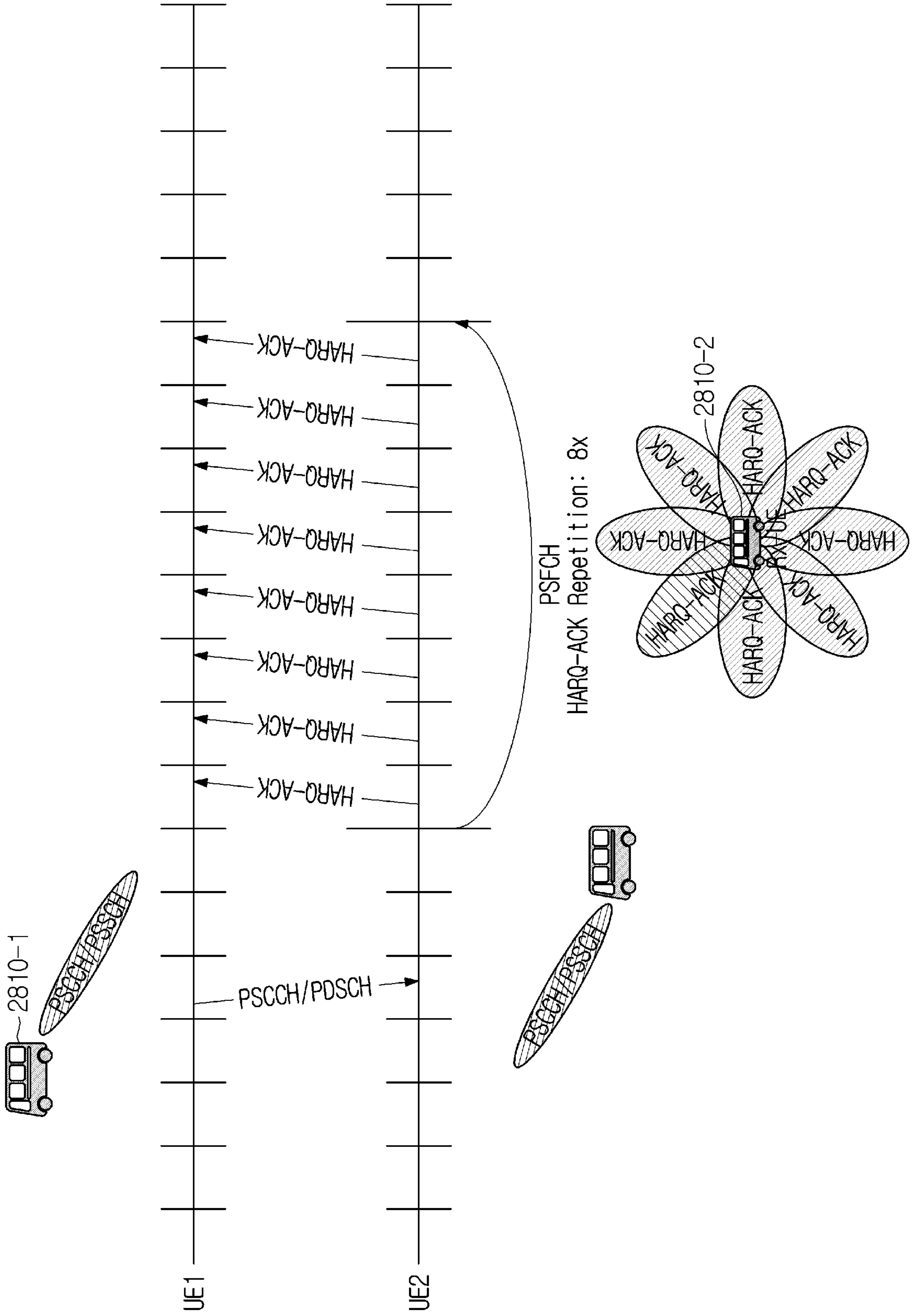
FIG. 28 illustrates another example of signal exchange for resource sensing in a wireless communication system according to an embodiment of the present disclosure.

FIG. 28 illustrates another example of signal exchange for resource sensing in a wireless communication system according to an embodiment of the present disclosure. FIG. 28 illustrates signal exchange in a situation where sl-PSFCH-Period-r16 is set to sl8, sl-MinTimeGapPSFCH-16 is set to sl2, and a HARQ-ACK repetition factor is set to 8, terminal B 2810-22 supports 8 transmit beams, and a repeated transmission interval T0 is set to 1-slot. Referring to FIG. 28, terminal A 2810-1 transmits a PSCCH and a PSSCH. In slots corresponding to ACK timings corresponding to the PSCCH and the PSSCH, terminal B 2810-2 repeatedly transmits HARQ-ACK information eight times. In this case, the HARQ-ACK information is transmitted using different transmit beams, and may be transmitted together with information related to the location of the PSSCH (e.g., SFRI, TRIV) according to various embodiments.

System and Various Devices to which Embodiments of the Present Disclosure are Applicable Various embodiments of the present disclosure may be combined with each other.

Hereinafter, a device to which various embodiments of the present disclosure may be applied will be described. Although not limited thereto, various descriptions, functions, procedures, proposals, methods, and/or operation flowcharts disclosed in this document may be applied to various fields requiring wireless communication/connection (e.g., 5G) between devices.

Hereinafter, it will be described in more detail with reference to the drawings. In the following drawings/description, the same reference numerals may represent the same or corresponding hardware blocks, software blocks, or functional blocks, unless otherwise indicated.

Figure 29:
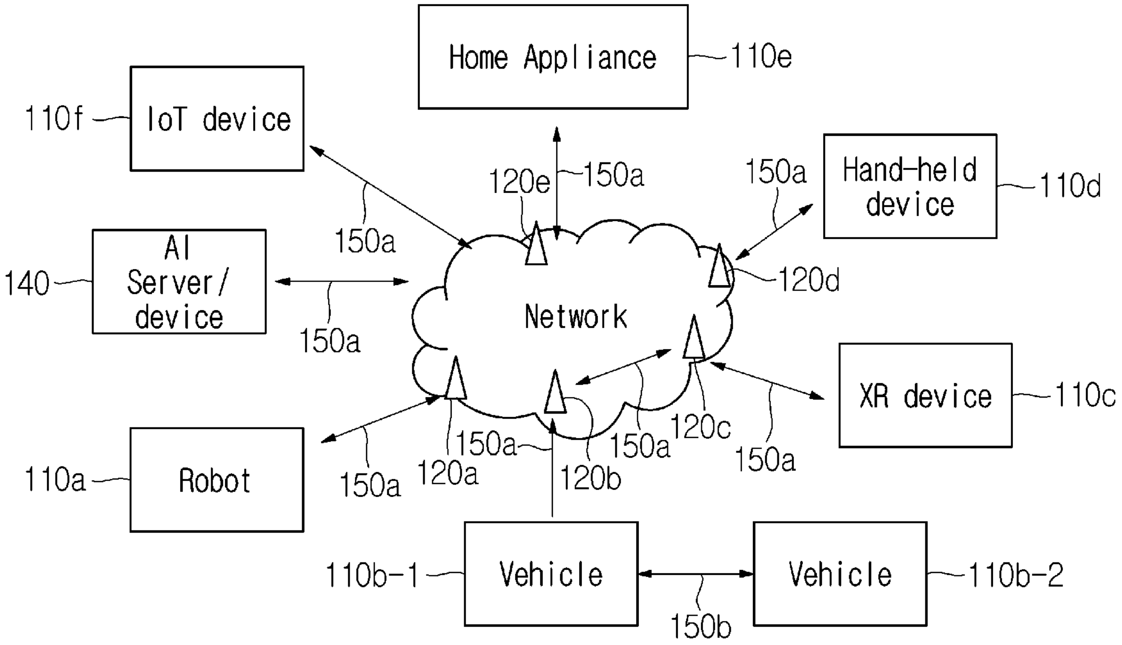
FIG. 29 illustrates a communication system, in accordance with an embodiment of the present disclosure.

FIG. 29 illustrates a communication system, in accordance with an embodiment of the present disclosure. The embodiment of FIG. 29 may be combined with various embodiments of the present disclosure.

Referring to FIG. 29, the communication system applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include at least one of a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120*a* to 120*e* network may be implemented by a wireless device, and a specific wireless device 120*a* may operate as a base station/network node for another wireless device.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network through the base station 120. AI technology is applicable to the wireless devices 100*a* to 100*f*, and the wireless devices 100*a* to 100*f* may be connected to the AI server 100*g* through the network. The network may be configured using a 3G network, a 4G (e.g., LTE) network or a 5G (e.g., NR) network, etc. The wireless devices 100*a* to 100*f* may communicate with each other through the base stations 120*a* to 120*e* or perform direct communication (e.g., sidelink communication) without through the base stations 120*a* to 120*e*. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base stations 120*a* to 120*e* and the base stations 120*a* to 120*e*/the base stations 120*a* to 120*e*. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Figure 30:
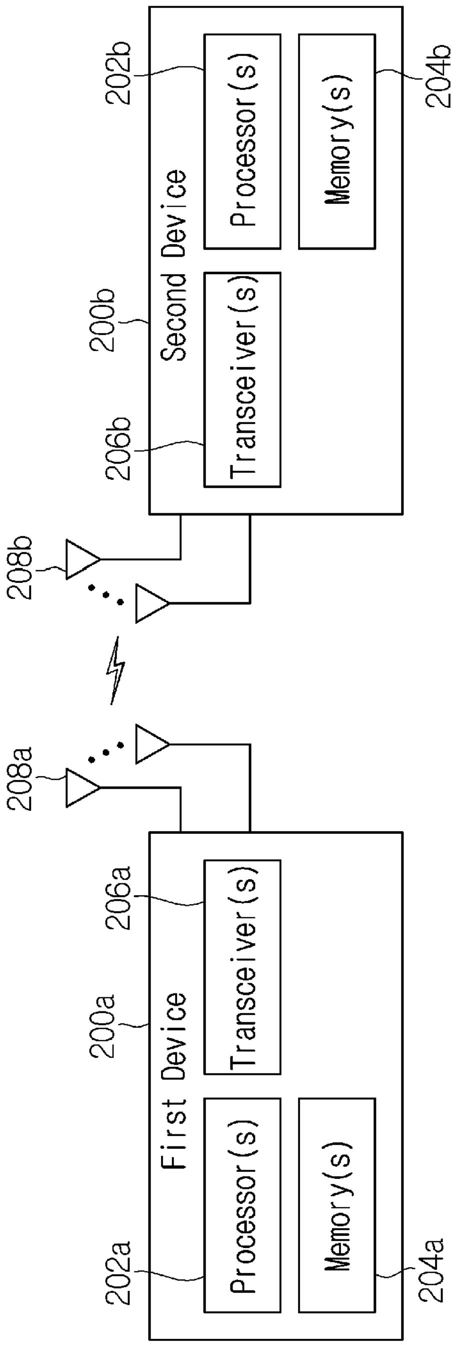
FIG. 30 illustrates wireless devices, in accordance with an embodiment of the present disclosure.

FIG. 30 illustrates wireless devices, in accordance with an embodiment of the present disclosure. The embodiment of FIG. 30 may be combined with various embodiments of the present disclosure.

Referring to FIG. 30, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 29.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may perform wireless communications with the first wireless device 200*a* and may include one or more processors 202*b* and one or more memories 204*b* and may further include one or more transceivers 206*b* and/or one or more antennas 208*b*. The functions of the one or more processors 202*b*, one or more memories 204*b*, one or more transceivers 206*b*, and/or one or more antennas 208*b* are similar to those of one or more processors 202*a*, one or more memories 204*a*, one or more transceivers 206*a* and/or one or more antennas 208*a* of the first wireless device 200*a*.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs), one or more service data unit (SDU), messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. In addition, one or more transceivers 206*a* and 206*b* may be coupled with one or more antennas 208*a* and 208*b*, and may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Figure 31:
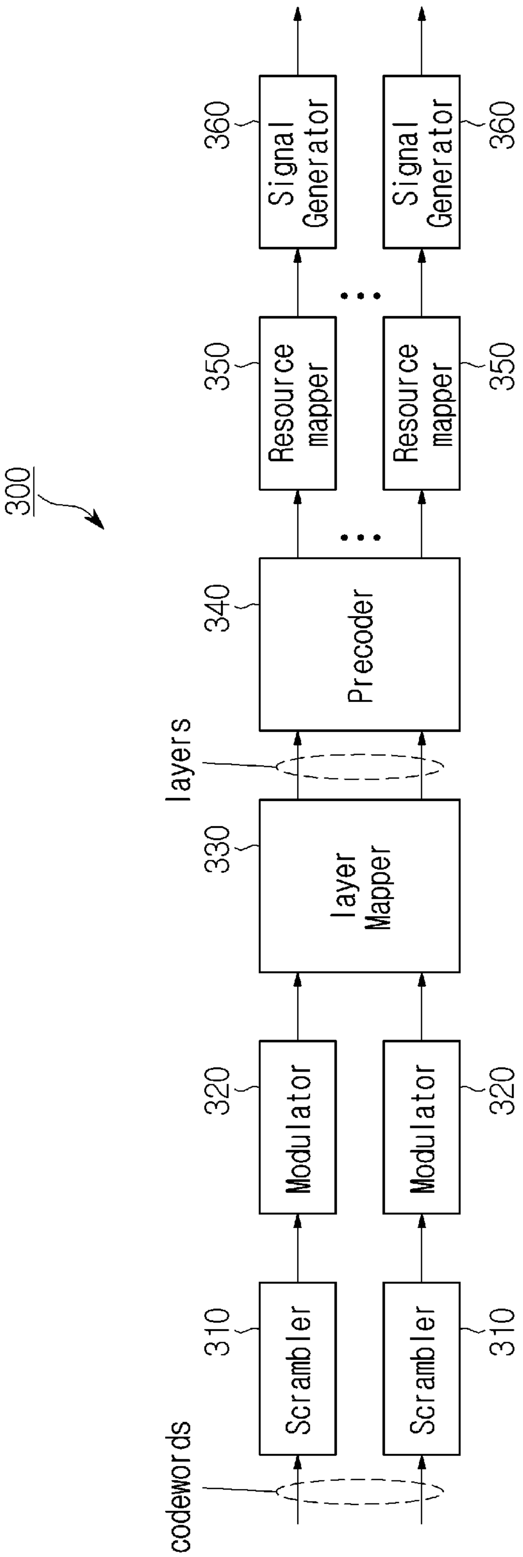
FIG. 31 illustrates a signal process circuit for a transmission signal, in accordance with an embodiment of the present disclosure.

FIG. 31 illustrates a signal process circuit for a transmission signal, in accordance with an embodiment of the present disclosure. The embodiment of FIG. 31 may be combined with various embodiments of the present disclosure.

Referring to FIG. 31, a signal processing circuit 300 may include scramblers 310, modulators 320, a layer mapper 330, a precoder 340, resource mappers 350, and signal generators 360. For example, an operation/function of FIG. 31 may be performed by the processors 202*a* and 202*b* and/or the transceivers 36 and 206 of FIG. 30. Hardware elements of FIG. 31 may be implemented by the processors 202*a* and 202*b* and/or the transceivers 36 and 206 of FIG. 30. For example, blocks 310 to 360 may be implemented by the processors 202*a* and 202*b* of FIG. 30. Alternatively, the blocks 310 to 350 may be implemented by the processors 202*a* and 202*b* of FIG. 30 and the block 360 may be implemented by the transceivers 36 and 206 of FIG. 30, and it is not limited to the above-described embodiment.

Codewords may be converted into radio signals via the signal processing circuit 300 of FIG. 31. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 310. Scramble sequences used for scrambling may be generated based on an initialization value, and the initialization value may include ID information of a wireless device. The scrambled bit sequences may be modulated to modulation symbol sequences by the modulators 320. A modulation scheme may include pi/2-Binary Phase Shift Keying (pi/2-BPSK), m-Phase Shift Keying (m-PSK), and m-Quadrature Amplitude Modulation (m-QAM).

Complex modulation symbol sequences may be mapped to one or more transport layers by the layer mapper 330. Modulation symbols of each transport layer may be mapped (precoded) to corresponding antenna port(s) by the precoder 340. Outputs z of the precoder 340 may be obtained by multiplying outputs y of the layer mapper 330 by an N*M precoding matrix W. Herein, N is the number of antenna ports and M is the number of transport layers. The precoder 340 may perform precoding after performing transform precoding (e.g., DFT) for complex modulation symbols. Alternatively, the precoder 340 may perform precoding without performing transform precoding.

The resource mappers 350 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 360 may generate radio signals from the mapped modulation symbols and the generated radio signals may be transmitted to other devices through each antenna. For this purpose, the signal generators 360 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures of FIG. 31. For example, the wireless devices (e.g., 200*a* and 200*b* of FIG. 30) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 32:
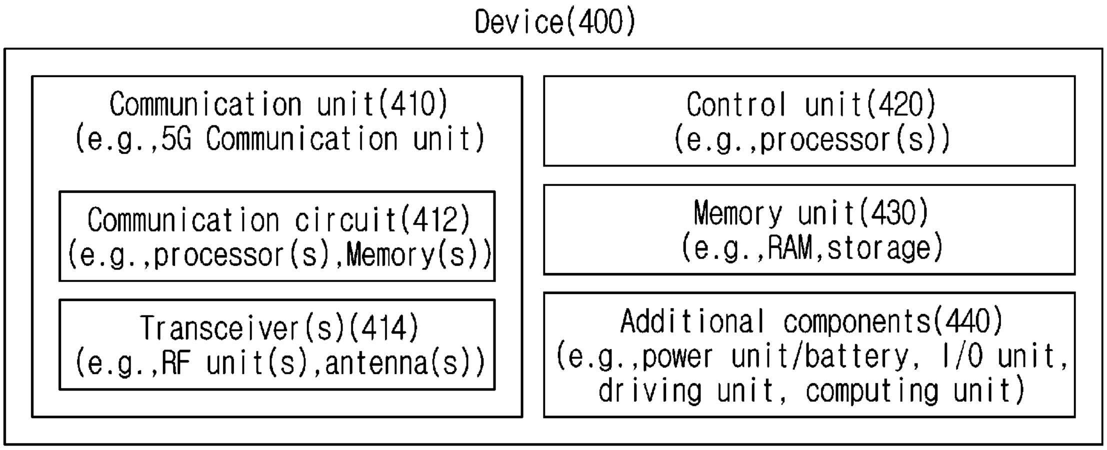
FIG. 32 illustrates a wireless device, in accordance with an embodiment of the present disclosure.

FIG. 32 illustrates a wireless device, in accordance with an embodiment of the present disclosure. The embodiment of FIG. 32 may be combined with various embodiments of the present disclosure.

Referring to FIG. 32, a wireless device 300 may correspond to the wireless devices 200*a* and 200*b* of FIG. 30 and include various elements, components, units/portions and/or modules. For example, the wireless device 300 may include a communication unit 310, a control unit (controller) 320, a memory unit (memory) 330 and additional components 340.

The communication unit 410 may include a communication circuit 412 and a transceiver(s) 414. The communication unit 410 may transmit and receive signals (e.g., data, control signals, etc.) to and from other wireless devices or base stations. For example, the communication circuit 412 may include one or more processors 202*a* and 202*b* and/or one or more memories 204*a* and 204*b* of FIG. 30. For example, the transceiver(s) 414 may include one or more transceivers 206*a* and 206*b* and/or one or more antennas 208*a* and 208*b* of FIG. 42.

The control unit 420 may be composed of at least one processor set. For example, the control unit 420 may be composed of a set of a communication control processor, an application processor, an electronic control unit (ECU), a graphic processing processor, a memory control processor, etc. The control unit 420 may be electrically coupled with the communication unit 410, the memory unit 430 and the additional components 440 to control overall operation of the wireless device. For example, the control unit 420 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The memory unit 430 may be composed of a random access memory (RAM), a dynamic RAM (DRAM), a read only memory (ROM), a flash memory, a volatile memory, a non-volatile memory and/or a combination thereof. The memory unit 430 may store data/parameters/programs/codes/commands necessary to derive the wireless device 400. In addition, the memory unit 430 may store input/output data/information, etc.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 41, 100*a*), the vehicles (FIGS. 41, 100*b*-1 and 100*b*-2), the XR device (FIG. 41, 100*c*), the hand-held device (FIG. 41, 100*d*), the home appliance (FIG. 41, 100*e*), the IoT device (FIG. 41, 100*f*), a digital broadcast terminal, a hologram apparatus, a public safety apparatus, an MTC apparatus, a medical apparatus, a Fintech device (financial device), a security device, a climate/environment device, an AI server/device (FIG. 41, 140), the base station (FIG. 41, 120), a network node, etc. The wireless device may be movable or may be used at a fixed place according to use example/service.

Figure 33:
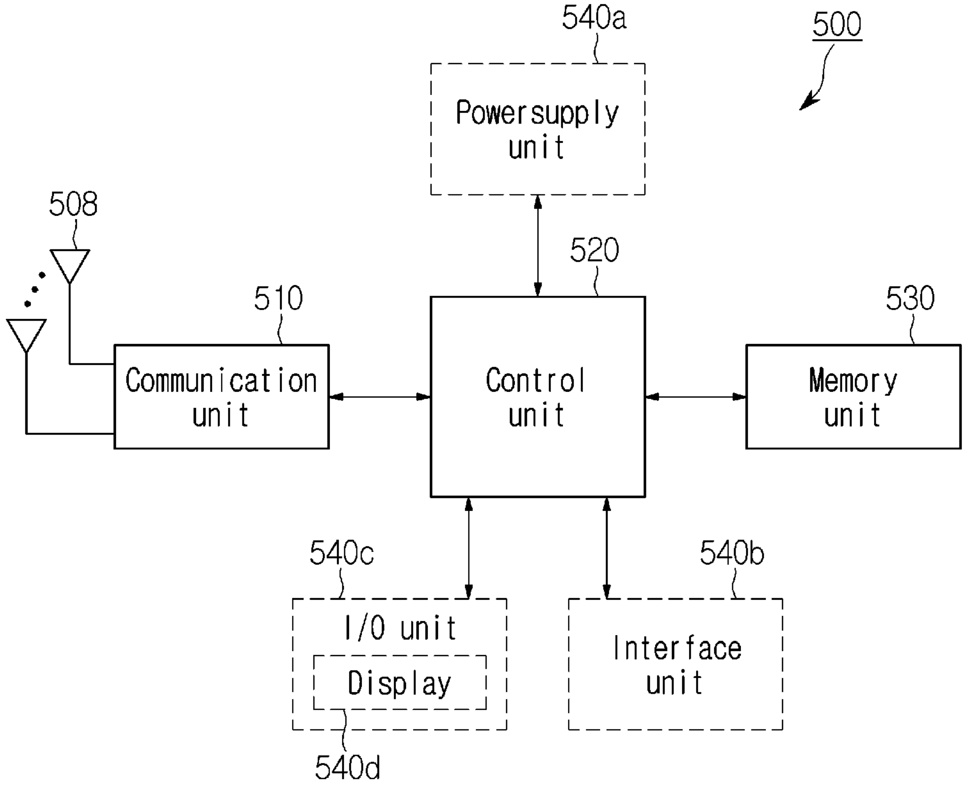
FIG. 33 illustrates a hand-held device, in accordance with an embodiment of the present disclosure.

FIG. 33 illustrates a hand-held device, in accordance with an embodiment of the present disclosure. FIG. 33 exemplifies a hand-held device applicable to the present disclosure. The hand-held device may include a smartphone, a smart pad, a wearable device (e.g., a smart watch or smart glasses), and a hand-held computer (e.g., a laptop, etc.). The embodiment of FIG. 33 may be combined with various embodiments of the present disclosure.

Referring to FIG. 33, the hand-held device 500 may include an antenna unit (antenna) 508, a communication unit (transceiver) 510, a control unit (controller) 520, a memory unit (memory) 530, a power supply unit (power supply) 540*a*, an interface unit (interface) 540*b*, and an input/output unit 540*c*. An antenna unit (antenna) 508 may be part of the communication unit 510. The blocks 510 to 530/440*a* to 540*c* may correspond to the blocks 310 to 330/340 of FIG. 32, respectively, and duplicate descriptions are omitted.

The communication unit 510 may transmit and receive signals and the control unit 520 may control the hand-held device 500, and the memory unit 530 may store data and so on. The power supply unit 540*a* may supply power to the hand-held device 500 and include a wired/wireless charging circuit, a battery, etc. The interface unit 540*b* may support connection between the hand-held device 500 and another external device. The interface unit 540*b* may include various ports (e.g., an audio input/output port and a video input/output port) for connection with the external device. The input/output unit 540*c* may receive or output video information/signals, audio information/signals, data and/or user input information. The input/output unit 540*c* may include a camera, a microphone, a user input unit, a display 540*d*, a speaker and/or a haptic module.

For example, in case of data communication, the input/output unit 540*c* may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540*c* in various forms (e.g., text, voice, image, video and haptic).

Figure 34:
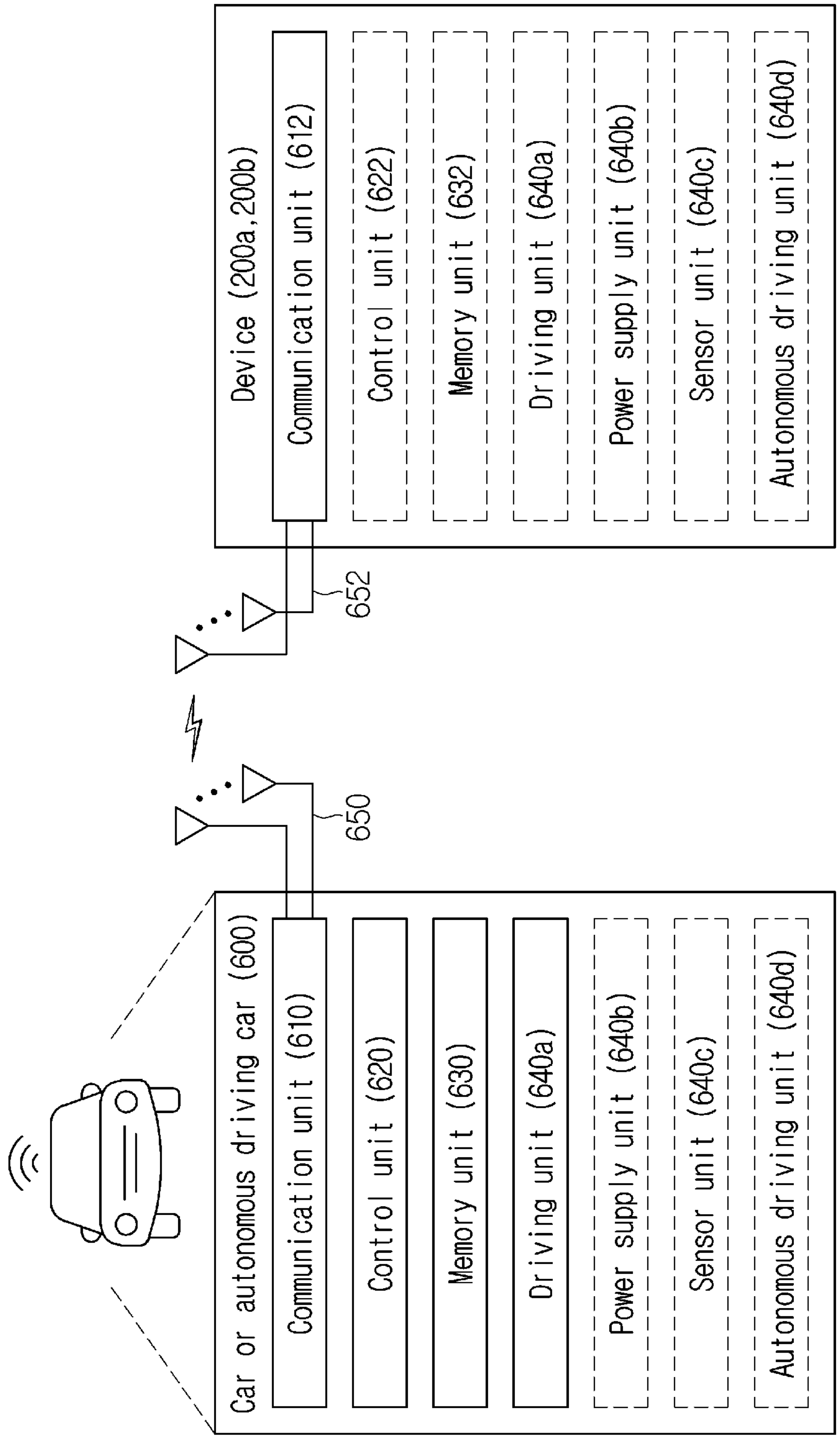
FIG. 34 illustrates a car or an autonomous vehicle, in accordance with an embodiment of the present disclosure.

FIG. 34 illustrates a car or an autonomous vehicle, in accordance with an embodiment of the present disclosure. FIG. 34 exemplifies a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited. The embodiment of FIG. 34 may be combined with various embodiments of the present disclosure Referring to FIG. 34, the car or autonomous driving car 600 may include an antenna unit (antenna) 608, a communication unit (transceiver) 610, a control unit (controller) 620, a driving unit 640*a*, a power supply unit (power supply) 640*b*, a sensor unit 640*c*, and an autonomous driving unit 640*d*. The antenna unit 650 may be configured as part of the communication unit 610. The blocks 610/630/640*a* to 640*d* correspond to the blocks 510/530/540 of FIG. 33, and duplicate descriptions are omitted.

The communication unit 610 may transmit and receive signals (e.g., data, control signals, etc.) to and from external devices such as another vehicle, a base station (e.g., a base station, a road side unit, etc.), and a server. The control unit 620 may control the elements of the car or autonomous driving car 600 to perform various operations. The control unit 620 may include an electronic control unit (ECU). The driving unit 640*a* may drive the car or autonomous driving car 600 on the ground. The driving unit 640*a* may include an engine, a motor, a power train, wheels, a brake, a steering device, etc. The power supply unit 640*b* may supply power to the car or autonomous driving car 600, and include a wired/wireless charging circuit, a battery, etc. The sensor unit 640*c* may obtain a vehicle state, surrounding environment information, user information, etc. The sensor unit 640*c* may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 640*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 610 may receive map data, traffic information data, etc. from an external server. The autonomous driving unit 640*d* may generate an autonomous driving route and a driving plan based on the acquired data. The control unit 620 may control the driving unit 640*a* (e.g., speed/direction control) such that the car or autonomous driving car 600 moves along the autonomous driving route according to the driving plane. During autonomous driving, the communication unit 610 may aperiodically/periodically acquire latest traffic information data from an external server and acquire surrounding traffic information data from neighboring cars. In addition, during autonomous driving, the sensor unit 640*c* may acquire a vehicle state and surrounding environment information. The autonomous driving unit 640*d* may update the autonomous driving route and the driving plan based on newly acquired data/information. The communication unit 610 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method of operating a terminal in a wireless communication system, the method comprising:

receiving sidelink data through a physical sidelink shared channel (PSSCH) from another terminal; and transmitting a feedback signal for the sidelink data through a physical sidelink feedback channel (PSFCH), wherein the feedback signal comprises hybrid automatic repeat request (HARQ)-acknowledge (ACK)/negative-ACK (NACK) information corresponding to the side-link, wherein the feedback signal further comprises information related to a location of the PSSCH slot in which the sidelink data is received and is transmitted using a plurality of beams, wherein the information related to the location of the PSSCH slot indicates a time resource indicator value (TRIV) included in sidelink control information (SCI) for the PSSCH, and wherein the information related to the location of the PSSCH slot is transmitted in an area assigned to indicate the TRIV in the PSFCH.

2. The method of claim 1, wherein the feedback signal is repeatedly transmitted using a HARQ-ACK repetition function.

3. The method of claim 1, wherein the information related to the location of the PSSCH slot is transmitted through a predefined one of subchannels corresponding to the location of the PSSCH, included in the PSFCH.

4. The method of claim 3, wherein the information related to the PSSCH is transmitted based on a resource block (RB) selected based on the number of PSSCHs multiplexed in a slot, in which the PSSCH is received, and a cyclic shift (CS).

5. The method of claim 1, wherein the information related to the location of the PSSCH slot is transmitted through a resource block determined by a source identifier set to 0, a starting subchannel index set to 0 and a group member identifier (ID) set to the number of PSSCHs multiplexed in a slot, in which the PSSCH is received, among resources included in the PSFCH.

6. The method of claim 1, wherein the area assigned to indicate the TRIV is frequency-division-multiplexed with subchannels for transmitting the HARQ-ACK/NACK, and comprises subchannels or resource blocks adjacent to the subchannels for transmitting the HARQ-ACK/NACK.

7. The method of claim 1, wherein the area assigned to indicate the TRIV is frequency-division-multiplexed with subchannels for transmitting the HARQ-ACK/NACK, and wherein a starting location of the area assigned to indicate the TRIV is indicated by higher layer signaling.

8. The method of claim 1, wherein the information related to the location of the PSSCH slot is expressed using a plurality of subchannels among subchannels included in the PSFCH, and wherein the information related to the location of the PSSCH slot is indicated by sequences, the number of which is determined based on a range of the TRIV value.

9. The method of claim 8, wherein, when a maximum number of reserved resources is 2, the TRIV is indicated using one sequence, and wherein, when the maximum number of reserved resources is 3, the TRIV is indicated using two sequences.

10. A terminal in a wireless communication system, the terminal comprising:

a transceiver; and a processor connected to the transceiver, wherein the processor performs control to:

receive sidelink data through a physical sidelink shared channel (PSSCH) from another terminal; and transmit a feedback signal for the sidelink data through a physical sidelink feedback channel (PSFCH), wherein the feedback signal comprises hybrid automatic repeat request (HARQ)-acknowledge (ACK)/negative-ACK (NACK) information corresponding to the side-link data, wherein the feedback signal further comprises information related to a location of the PSSCH slot in which the sidelink data is received and is transmitted using a plurality of beams, wherein the information related to the location of the PSSCH slot indicates a time resource indicator value (TRIV) included in sidelink control information (SCI) for the PSSCH, and wherein the information related to the location of the PSSCH slot is transmitted in an area assigned to indicate the TRIV in the PSFCH.

11. The terminal of claim 10, wherein the feedback signal is repeatedly transmitted using a HARQ-ACK repetition function.

12. The terminal of claim 10, wherein the information related to the location of the PSSCH slot is transmitted through a predefined one of subchannels corresponding to the location of the PSSCH, included in the PSFCH.

13. The terminal of claim 10, wherein the information related to the location of the PSSCH slot is transmitted through a resource block determined by a source identifier set to 0, a starting subchannel index set to 0 and a group member identifier (ID) set to the number of PSSCHs multiplexed in a slot, in which the PSSCH is received, among resources included in the PSFCH.

14. A terminal in a wireless communication system, the terminal comprising:

a transceiver; and a processor connected to the transceiver, wherein the processor performs control to:

receive a feedback signal transmitted through a physical sidelink feedback channel (PSFCH) from one of other terminals performing sidelink communication;

identify information related to a location of a physical sidelink shared channel (PSSCH) slot corresponding to the PSFCH based on the feedback signal; and transmit sidelink data using a selected resource based on the information, wherein the feedback signal comprises hybrid automatic repeat request (HARQ)-acknowledge (ACK)/negative-ACK (NACK) information corresponding to sidelink data transmitted between the other terminals and information related to a location of the PSSCH slot in which the sidelink data is received by one of the other terminals, wherein the feedback signal is transmitted using a plurality of beams, wherein the information related to the location of the PSSCH slot indicates a time resource indicator value (TRIV) included in sidelink control information (SCI) for the PSSCH, and wherein the information related to the location of the PSSCH slot is transmitted in an area assigned to indicate the TRIV in the PSFCH.

15. The terminal of claim 14, wherein the terminal and the other terminals belong to a cluster having the same sidelink resource pool and a reference synchronization timing.

16. The terminal of claim 14, wherein the information related to the location of the PSSCH slot is received through a resource block determined by a source identifier set to 0, a starting subchannel index set to 0 and a group member identifier (ID) set to the number of PSSCHs multiplexed in a slot, in which the PSSCH is received, among resources included in the PSFCH.

* * * * *